United States Patent
Gao et al.

(10) Patent No.: US 10,873,421 B2
(45) Date of Patent: Dec. 22, 2020

(54) METHOD AND DEVICE FOR TRANSMITTING AND RECEIVING FEEDBACK INFORMATION OF PHYSICAL UPLINK SHARED CHANNEL

(71) Applicant: China Academy of Telecommunications Technology, Beijing (CN)

(72) Inventors: Xuejuan Gao, Beijing (CN); Xueming Pan, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 15 days.

(21) Appl. No.: 16/312,201

(22) PCT Filed: Apr. 13, 2017

(86) PCT No.: PCT/CN2017/080449
§ 371 (c)(1),
(2) Date: Dec. 20, 2018

(87) PCT Pub. No.: WO2017/219738
PCT Pub. Date: Dec. 28, 2017

(65) Prior Publication Data
US 2019/0280822 A1  Sep. 12, 2019

(30) Foreign Application Priority Data

Jun. 22, 2016 (CN) .......................... 2016 1 0460690

(51) Int. Cl.
*H04L 1/18* (2006.01)
*H04L 1/00* (2006.01)
(Continued)

(52) U.S. Cl.
CPC .......... *H04L 1/1812* (2013.01); *H04L 1/1854* (2013.01); *H04L 5/0055* (2013.01); *H04L 5/14* (2013.01); *H04W 72/0446* (2013.01)

(58) Field of Classification Search
None
See application file for complete search history.

(56) References Cited

U.S. PATENT DOCUMENTS 8,798,014 B2 * 8/2014 Pan ...................... H04W 72/048
370/321
9,451,606 B2 * 9/2016 Zhao ...................... H04L 1/1861
(Continued)

FOREIGN PATENT DOCUMENTS

| CN | 102355731 A | 2/2012 |
| CN | 103327628 A | 9/2013 |

(Continued)

OTHER PUBLICATIONS

3GPP, TS 36.211 V12.8.0, Physical channels and modulation (Release 12), 3GPP, (Dec. 8, 2015).
(Continued)

*Primary Examiner* — Justin R Knapp
(74) *Attorney, Agent, or Firm* — Foley & Lardner LLP

(57) ABSTRACT

The invention relates to the field of wireless communication technology, and in particular, to a method and device for transmitting and receiving feedback information, resolving a problem of providing ACK/NACK feedback of a physical uplink shared channel (PUSCH) transmission in an uplink pilot time slot (UpPTS). In one embodiment of the invention, the method comprises: a terminal transmits, in a special subframe n, PUSCH data, and receive, in a subframe (n+$k_{PHICH}$), physical hybrid-ARQ indicator channel (PHICH) data corresponding to the PUSCH data, wherein a PHICH is used to carry feedback information of the PUSCH data; and a network apparatus receives, in the special
(Continued)

```
                          ┌─ 700
┌─────────────────────────────────────────┐
│ A UE transmits a PUSCH in a special subframe n │
└─────────────────────────────────────────┘
                    │
                    ▼      ┌─ 701
┌─────────────────────────────────────────┐
│ The UE receives a PHICH corresponding to the  │
│ PUSCH in a subframe n+$k_{PHICH}$, where the PHICH │
│ carries feedback information of the PUSCH, and │
│ $k_{PHICH}$ is a prescribed or preconfigured value │
└─────────────────────────────────────────┘
``` subframe n, the PUSCH data, and transmits, in the subframe $(n+k_{PHICH})$, the PHICH data corresponding to the PUSCH data. Therefore, the embodiment implements transmission of ACK/NACK of PUSCH data in an UpPTS.

10 Claims, 3 Drawing Sheets

(51) Int. Cl.
*H04L 5/14* (2006.01)
*H04L 5/00* (2006.01)
*H03M 13/00* (2006.01)
*H04W 72/04* (2009.01)

(56) References Cited

U.S. PATENT DOCUMENTS

| | | | | |
|---|---|---|---|---|
| 10,314,048 | B2* | 6/2019 | Nguyen | H04W 72/0446 |
| 2013/0194980 | A1 | 8/2013 | Yin | |
| 2017/0034819 | A1* | 2/2017 | Wang | H04W 72/042 |
| 2017/0171848 | A1* | 6/2017 | Xu | H04W 72/12 |
| 2018/0310324 | A1* | 10/2018 | Ibars Casas | H04L 1/1812 |
| 2020/0045688 | A1* | 2/2020 | Miao | H04L 1/1628 |

FOREIGN PATENT DOCUMENTS

| | | | |
|---|---|---|---|
| CN | 103546235 A | 1/2014 | |
| EP | 3 131 222 A1 | 2/2017 | |
| EP | 3131222 A1 * | 2/2017 | ........ H04L 1/1812 |
| JP | 2017-511076 A | 4/2017 | |
| WO | WO2015/154310 A1 | 10/2015 | |

OTHER PUBLICATIONS

3GPP, TS 36.213 V12.10.0, Physical layer procedures (Release 13), 3GPP, (Jun. 21, 2016).

* cited by examiner

--Prior art--

METHOD AND DEVICE FOR TRANSMITTING AND RECEIVING FEEDBACK INFORMATION OF PHYSICAL UPLINK SHARED CHANNEL

This application is a National Stage of International Application No. PCT/CN2017/080449, filed Apr. 13, 2017, which claims priority to Chinese Patent Application No. 201610460690.8, filed with the Chinese Patent Office on Jun. 22, 2016, and entitled "Method and device for transmitting feedback information, and method and device for receiving feedback information", which is hereby incorporated by reference in its entirety.

FIELD

The present invention relates to the field of wireless communications, and particularly to a method and device for transmitting feedback information, and a method and device for receiving feedback information.

BACKGROUND

FIG. 1 illustrates the frame structure type 2 (FS2) applicable to the existing Long Term Evolution (LTE) Time Division Duplex (TDD) system. In the TDD system, different subframes or timeslots in the same frequency are configured for uplink and downlink transmission. In the FS2, each 10 ms radio frame includes two 5 ms half-frames, and each half-frame includes five subframes with the length of 1 ms. The subframes in the FS2 are categorized into three categories: downlink subframes, uplink subframes, and special subframes, and each special subframe includes three components of a Downlink Pilot Time Slot (DwPTS), a Guard Period (GP), and an Uplink Pilot Time Slot (UpPTS). Table 1 depicts seven uplink-downlink subframe configurations supported in the FS2.

TABLE 1

| Uplink-downlink configuration number | Downlink-to-Uplink switch-point periodicity | \multicolumn{10}{c|}{Subframe index} |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As there is an evolving demand for mobile communication traffic, in order to enable uplink transmission in a TDD special subframe, a new TDD special subframe configuration has been defined as proposed to include a DwPTS of six symbols, a GP of two symbols, and an UpPTS of six symbols, for example; and in the new special subframe configuration, the length of the UpPTS is increased, so that a UE can transmit an uplink shared channel, etc., in the UpPTS.

However transmission of a PUSCH in an UpPTS has not been supported in the existing LTE system, so there has been absent so far a solution to transmitting Acknowledgement (ACK)/Negative Acknowledgement (NACK) feedback information of a PUSCH in an UpPTS.

SUMMARY

Embodiments of the invention provide a method and device for transmitting feedback information, and a method and device for receiving feedback information so as to address the problem of how to feedback ACK/NACK for a PUSCH transmitted in an UpPTS.

In a first aspect, an embodiment of the invention provides a method for receiving feedback information. The method includes: transmitting, by a UE, a PUSCH in a special subframe n; and receiving, by the UE, a PHICH corresponding to the PUSCH in a subframe $n+k_{PHICH}$, wherein the PHICH carries feedback information of the PUSCH, and $k_{PHICH}$ is a prescribed or preconfigured value.

Optionally for the TDD uplink-downlink configuration 0, when n is 1 or 6, then $k_{PHICH}$ is one of 4, 5, 9, and 10; or
for the TDD uplink-downlink configuration 1, when n is 1 or 6, then $k_{PHICH}$ is one of 3, 4, 5, 8, 9, and 10; or
for the TDD uplink-downlink configuration 2, when n is 1 or 6, then $k_{PHICH}$ is one of 2, 3, 4, 5, 7, 8, 9, and 10; or
for the TDD uplink-downlink configuration 3, when n is 1, then $k_{PHICH}$ is one of 4, 5, 6, 7, 8, 9, and 10; or
for the TDD uplink-downlink configuration 4, when n is 1, then $k_{PHICH}$ is one of 3, 4, 5, 6, 7, 8, 9, and 10; or
for the TDD uplink-downlink configuration 5, when n is 1, then $k_{PHICH}$ is one of 2, 3, 4, 5, 6, 7, 8, 9, and 10; or
for the TDD uplink-downlink configuration 6, when n is 1, then $k_{PHICH}$ is one of 4, 5, 8, 9, and 10; or
for the TDD uplink-downlink configuration 6, when n is 6, then $k_{PHICH}$ is one of 3, 4, 5, 9, and 10;
wherein the TDD uplink-downlink configuration is an uplink reference TDD uplink-downlink configuration, or a TDD uplink-downlink configuration configured in system information.

Optionally for the TDD uplink-downlink configuration 1, when the subframe $n+k_{PHICH}$ is the subframe 0 or 5, or for the TDD uplink-downlink configuration 2, when the subframe $n+k_{PHICH}$ is the subframe 0, 1, 4, 5, 6, or 9, or for the TDD uplink-downlink configuration 3, when the subframe $n+k_{PHICH}$ is the subframe 1, 5, 6, or 7, or for the TDD uplink-downlink configuration 4, when the subframe $n+k_{PHICH}$ is the subframe 0, 1, 4, 5, 6, or 7, or for the TDD uplink-downlink configuration 5, when the subframe $n+k_{PHICH}$ is the subframe 0, 1, 3, 4, 5, 6, 7, or 9, then the subframe $n+k_{PHICH}$ includes $m_i * N_{PHICH}^{group}$ groups of PHICHs, wherein $m_i$ is 1;
wherein i is a subframe index of the subframe $n+k_{PHICH}$, and $N_{PHICH}^{group}$ is the number of PHICH groups determined according to a parameter configured in high-layer signaling.

Optionally receiving, by the UE, the PHICH corresponding to the PUSCH in the subframe $n+k_{PHICH}$ includes:

determining, by the UE, $I_{PHICH}$ corresponding to the PUSCH transmitted in the special subframe n to be $I_{PHICH}=0$, and determining a PHICH resource, corresponding to the PUSCH, in the subframe $n+k_{PHICH}$ according to a value of $I_{PHICH}$; and receiving, by the UE, the PHICH corresponding to the PUSCH in the subframe $n+k_{PHICH}$ according to the determined PHICH resource;

wherein $I_{PHICH}$ is a parameter for determining the PHICH resource.

Optionally for the TDD uplink-downlink configuration 0, when $k_{PHICH}$ is 4, 5, 9, or 10, or for the TDD uplink-downlink configuration 1, when $k_{PHICH}$ is 3, 5, 8, or 10, or for the TDD uplink-downlink configuration 2, when $k_{PHICH}$ is 2 or 7, or for the TDD uplink-downlink configuration 3, when $k_{PHICH}$ is 7, 8, or 9, or for the TDD uplink-downlink configuration 4, when $k_{PHICH}$ is 7 or 8, or for the TDD uplink-downlink configuration 5, when $k_{PHICH}$ is 7, or for the TDD uplink-downlink configuration 6, when $k_{PHICH}$ is 3, 4, 5, 8, 9, or 10, then the subframe $n+k_{PHICH}$ includes $m_i * N_{PHICH}^{group}$ groups of PHICHs, wherein $m_i$ is a value defined in the 3GPP TS 36.211;

wherein i is a subframe index of the subframe $n+k_{PHICH}$, $m_i$ is a coefficient for determining the number of PHICH groups corresponding to a subframe i in a TDD system, and $N_{PHICH}^{group}$ is the number of PHICH groups determined according to a parameter configured in high-layer signaling.

Optionally receiving, by the UE, the PHICH corresponding to the PUSCH in the subframe $n+k_{PHICH}$ includes:

determining, by the UE, a PHICH resource, corresponding to the PUSCH transmitted in the special subframe n, in the subframe $n+k_{PHICH}$ according to a lowest PRB index of the PUSCH transmitted in the special subframe n, DMRS cyclic shift information indicated in scheduling information of the PUSCH, and a prescribed or preconfigured value of $I_{PHICH}$ corresponding to the PUSCH transmitted in the special subframe n; and receiving, by the UE, the PHICH corresponding to the PUSCH in the subframe $n+k_{PHICH}$ according to the determined PHICH resource;

wherein the lowest PRB index of the PUSCH transmitted in the special subframe n is different from a lowest PRB index of a PUSCH transmitted in a corresponding uplink subframe for which the PHICH is received according to the value of $I_{PHICH}$ in the subframe $n+k_{PHICH}$, and/or the DMRS cyclic shift information indicated in the scheduling information of the PUSCH transmitted in the special subframe n is different from DMRS cyclic shift information indicated in scheduling information of a PUSCH transmitted in a corresponding uplink subframe for which the PHICH is received according to the value of $I_{PHICH}$ in the subframe $n+k_{PHICH}$.

Optionally for the TDD uplink-downlink configuration 0, when the subframe $n+k_{PHICH}$ is the subframe 1 or 6, or for the TDD uplink-downlink configuration 1, when the subframe $n+k_{PHICH}$ is the subframe 1, 4, 6, or 9, or for the TDD uplink-downlink configuration 2, when the subframe $n+k_{PHICH}$ is the subframe 3 or 8, or for the TDD uplink-downlink configuration 3, when the subframe $n+k_{PHICH}$ is the subframe 0, 8, or 9, or for the TDD uplink-downlink configuration 4, when the subframe $n+k_{PHICH}$ is the subframe 8 or 9, or for the TDD uplink-downlink configuration 5, when the subframe $n+k_{PHICH}$ is the subframe 8, or for the TDD uplink-downlink configuration 6, when the subframe $n+k_{PHICH}$ is the subframe 0, 1, 5, 6, or 9, then the subframe $n+k_{PHICH}$ includes $m_i * N_{PHICH}^{group}$ groups of PHICHs, wherein $m_i$ is 2;

wherein i is a subframe index of the subframe $n+k_{PHICH}$, and $N_{PHICH}^{group}$ is the number of PHICH groups determined according to a parameter configured in high-layer signaling.

Optionally receiving, by the UE, the PHICH corresponding to the PUSCH in the subframe $n+k_{PHICH}$ includes:

determining, by the UE, $I_{PHICH}$ corresponding to the PUSCH transmitted in the special subframe n to be $I_{PHICH}=1$, and determining a PHICH resource, corresponding to the PUSCH, in the subframe $n+k_{PHICH}$ according to the value of $I_{PHICH}$; and receiving, by the UE, the PHICH corresponding to the PUSCH in the subframe $n+k_{PHICH}$ according to the determined PHICH resource;

wherein $I_{PHICH}$ is a parameter for determining the PHICH resource.

Optionally for the TDD uplink-downlink configuration 0, when the subframe $n+k_{PHICH}$ is the subframe 0 or 5, then the subframe $n+k_{PHICH}$ includes $m_i * N_{PHICH}^{group}$ groups of PHICHs, wherein $m_i$ is 3;

wherein i is a subframe index of the subframe $n+k_{PHICH}$, and $N_{PHICH}^{group}$ is the number of PHICH groups determined according to a parameter configured in high-layer signaling.

Optionally receiving, by the UE, the PHICH corresponding to the PUSCH in the subframe $n+k_{PHICH}$ includes:

determining, by the UE, $I_{PHICH}$ corresponding to the PUSCH transmitted in the special subframe n to be $I_{PHICH}=2$, and determining a PHICH resource, corresponding to the PUSCH, in the subframe $n+k_{PHICH}$ according to a value of $I_{PHICH}$; and receiving, by the UE, the PHICH corresponding to the PUSCH in the subframe $n+k_{PHICH}$ according to the determined PHICH resource;

wherein $I_{PHICH}$ is a parameter for determining the PHICH resource.

In a second embodiment, an embodiment of the invention provides another method for transmitting feedback information, the method including:

receiving, by a network-side device, a PUSCH in a special subframe n; and transmitting, by the network-side device, a PHICH corresponding to the PUSCH in a subframe $n+k_{PHICH}$, wherein the PHICH carries feedback information of the PUSCH, and $k_{PHICH}$ is a prescribed or preconfigured value.

Optionally for the TDD uplink-downlink configuration 0, when n is 1 or 6, then $k_{PHICH}$ is one of 4, 5, 9, and 10; or for the TDD uplink-downlink configuration 1, when n is 1 or 6, then $k_{PHICH}$ is one of 3, 4, 5, 8, 9, and 10; or for the TDD uplink-downlink configuration 2, when n is 1 or 6, then $k_{PHICH}$ is one of 2, 3, 4, 5, 7, 8, 9, and 10; or for the TDD uplink-downlink configuration 3, when n is 1, then $k_{PHICH}$ is one of 4, 5, 6, 7, 8, 9, and 10; or for the TDD uplink-downlink configuration 4, when n is 1, then $k_{PHICH}$ is one of 3, 4, 5, 6, 7, 8, 9, and 10; or for the TDD uplink-downlink configuration 5, when n is 1, then $k_{PHICH}$ is one of 2, 3, 4, 5, 6, 7, 8, 9, and 10; or for the TDD uplink-downlink configuration 6, when n is 1, then $k_{PHICH}$ is one of 4, 5, 8, 9, and 10; or for the TDD uplink-downlink configuration 6, when n is 6, then $k_{PHICH}$ is one of 3, 4, 5, 9, and 10;

wherein the TDD uplink-downlink configuration is an uplink reference TDD uplink-downlink configuration, or a TDD uplink-downlink configuration configured in system information.

Optionally for the TDD uplink-downlink configuration 1, when the subframe $n+k_{PHICH}$ is the subframe 0 or 5, or for the TDD uplink-downlink configuration 2, when the subframe $n+k_{PHICH}$ is the subframe 0, 1, 4, 5, 6, or 9, or for the TDD uplink-downlink configuration 3, when the subframe $n+k_{PHICH}$ is the subframe 1, 5, 6, or 7, or for the TDD uplink-downlink configuration 4, when the subframe $n+k_{PHICH}$ is the subframe 0, 1, 4, 5, 6, or 7, or for the TDD uplink-downlink configuration 5, when the subframe $n+k_{PHICH}$ is the subframe 0, 1, 3, 4, 5, 6, 7, or 9, then the subframe $n+k_{PHICH}$ includes $m_i*N_{PHICH}^{group}$ groups of PHICHs, wherein $m_i$ is 1;

wherein i is a subframe index of the subframe $n+k_{PHICH}$, and $N_{PHICH}^{group}$ is the number of PHICH groups determined according to a parameter configured in high-layer signaling.

Optionally transmitting, by the network-side device, the PHICH corresponding to the PUSCH in the subframe $n+k_{PHICH}$ includes:

determining, by the network-side device, $I_{PHICH}$ corresponding to the PUSCH transmitted in the special subframe n to be $I_{PHICH}=0$, and determining a PHICH resource, corresponding to the PUSCH, in the subframe $n+k_{PHICH}$ according to a value of $I_{PHICH}$; and transmitting, by the network-side device, the PHICH corresponding to the PUSCH in the subframe $n+k_{PHICH}$ according to the determined PHICH resource;

wherein $I_{PHICH}$ is a parameter for determining the PHICH resource.

Optionally for the TDD uplink-downlink configuration 0, when $k_{PHICH}$ is 4, 5, 9, or 10, or for the TDD uplink-downlink configuration 1, when $k_{PHICH}$ is 3, 5, 8, or 10, or for the TDD uplink-downlink configuration 2, when $k_{PHICH}$ is 2 or 7, or for the TDD uplink-downlink configuration 3, when $k_{PHICH}$ is 7, 8, or 9, or for the TDD uplink-downlink configuration 4, when $k_{PHICH}$ is 7 or 8, or for the TDD uplink-downlink configuration 5, when $k_{PHICH}$ is 7, or for the TDD uplink-downlink configuration 6, when $k_{PHICH}$ is 3, 4, 5, 8, 9, or 10, then the subframe $n+k_{PHICH}$ includes $m_i*N_{PHICH}^{group}$ groups of PHICHs, wherein $m_i$ is a value defined in the 3GPP TS 36.211;

wherein i is a subframe index of the subframe $n+k_{PHICH}$, $m_i$ is a coefficient for determining the number of PHICH groups corresponding to a subframe i in a TDD system, and $N_{PHICH}^{group}$ is the number of PHICH groups determined according to a parameter configured in high-layer signaling.

Optionally transmitting, by the network-side device, the PHICH corresponding to the PUSCH in the subframe $n+k_{PHICH}$ includes:

determining, by the network-side device, a PHICH resource, corresponding to the PUSCH transmitted in the special subframe n, in the subframe $n+k_{PHICH}$ according to a lowest PRB index of the PUSCH transmitted in the special subframe n, DMRS cyclic shift information indicated in scheduling information of the PUSCH, and a prescribed or preconfigured value of $I_{PHICH}$ corresponding to the PUSCH transmitted in the special subframe n; and transmitting, by the network-side device, the PHICH corresponding to the PUSCH in the subframe $n+k_{PHICH}$ according to the determined PHICH resource;

wherein the lowest PRB index of the PUSCH transmitted in the special subframe n is different from a lowest PRB index of a PUSCH transmitted in a corresponding uplink subframe for which the PHICH is received according to the value of $I_{PHICH}$ in the subframe $n+k_{PHICH}$, and/or the DMRS cyclic shift information indicated in the scheduling information of the PUSCH transmitted in the special subframe n is different from DMRS cyclic shift information indicated in scheduling information of a PUSCH transmitted in a corresponding uplink subframe for which the PHICH is received according to the value of $I_{PHICH}$ in the subframe $n+k_{PHICH}$.

Optionally for the TDD uplink-downlink configuration 0, when the subframe $n+k_{PHICH}$ is the subframe 1 or 6, or for the TDD uplink-downlink configuration 1, when the subframe $n+k_{PHICH}$ is the subframe 1, 4, 6, or 9, or for the TDD uplink-downlink configuration 2, when the subframe $n+k_{PHICH}$ is the subframe 3 or 8, or for the TDD uplink-downlink configuration 3, when the subframe $n+k_{PHICH}$ is the subframe 0, 8, or 9, or for the TDD uplink-downlink configuration 4, when the subframe $n+k_{PHICH}$ is the subframe 8 or 9, or for the TDD uplink-downlink configuration 5, when the subframe $n+k_{PHICH}$ is the subframe 8, or for the TDD uplink-downlink configuration 6, when the subframe $n+k_{PHICH}$ is the subframe 0, 1, 5, 6, or 9, then the subframe $n+k_{PHICH}$ includes $m_i*N_{PHICH}^{group}$ groups of PHICHs, wherein $m_i$ is 2;

wherein i is a subframe index of the subframe $n+k_{PHICH}$, and $N_{PHICH}^{group}$ is the number of PHICH groups determined according to a parameter configured in high-layer signaling.

Optionally transmitting, by the network-side device, the PHICH corresponding to the PUSCH in the subframe $n+k_{PHICH}$ includes:

determining, by the network-side device, $I_{PHICH}$ corresponding to the PUSCH transmitted in the special subframe n to be $I_{PHICH}=1$, and determining a PHICH resource, corresponding to the PUSCH, in the subframe $n+k_{PHICH}$ according to a value of $I_{PHICH}$; and transmitting, by the network-side device, the PHICH corresponding to the PUSCH in the subframe $n+k_{PHICH}$ according to the determined PHICH resource;

wherein $I_{PHICH}$ is a parameter for determining the PHICH resource.

Optionally for the TDD uplink-downlink configuration 0, when the subframe $n+k_{PHICH}$ is the subframe 0 or 5, then the subframe $n+k_{PHICH}$ includes $m_i*N_{PHICH}^{group}$ groups of PHICHs, wherein $m_i$ is 3;

wherein i is a subframe index of the subframe $n+k_{PHICH}$, and $N_{PHICH}^{group}$ is the number of PHICH groups determined according to a parameter configured in high-layer signaling.

Optionally transmitting, by the network-side device, the PHICH corresponding to the PUSCH in the subframe $n+k_{PHICH}$ includes:

determining, by the network-side device, $I_{PHICH}$ corresponding to the PUSCH transmitted in the special subframe n to be $I_{PHICH}=2$, and determining a PHICH resource, corresponding to the PUSCH, in the subframe $n+k_{PHICH}$ according to a value of $I_{PHICH}$; and transmitting, by the network-side device, the PHICH corresponding to the PUSCH in the subframe $n+k_{PHICH}$ according to the determined PHICH resource;

wherein $I_{PHICH}$ is a parameter for determining the PHICH resource.

In a third aspect, an embodiment of the invention provides a first UE for receiving feedback information, the UE including:

a transmitting module configured to transmit a PUSCH in a special subframe n; and a first receiving module configured to receive a PHICH corresponding to the PUSCH in a subframe $n+k_{PHICH}$, wherein the PHICH carries feedback information of the PUSCH, and $k_{PHICH}$ is a prescribed or preconfigured value.

Optionally for the TDD uplink-downlink configuration 0, when n is 1 or 6, then $k_{PHICH}$ is one of 4, 5, 9, and 10; or for the TDD uplink-downlink configuration 1, when n is 1 or 6, then $k_{PHICH}$ is one of 3, 4, 5, 8, 9, and 10; or for the TDD uplink-downlink configuration 2, when n is 1 or 6, then $k_{PHICH}$ is one of 2, 3, 4, 5, 7, 8, 9, and 10; or for the TDD uplink-downlink configuration 3, when n is 1, then $k_{PHICH}$ is one of 4, 5, 6, 7, 8, 9, and 10; or for the TDD uplink-downlink configuration 4, when n is 1, then $k_{PHICH}$ is one of 3, 4, 5, 6, 7, 8, 9, and 10; or for the TDD uplink-downlink configuration 5, when n is 1, then $k_{PHICH}$ is one of 2, 3, 4, 5, 6, 7, 8, 9, and 10; or for the TDD uplink-downlink configuration 6, when n is 1, then $k_{PHICH}$ is one of 4, 5, 8, 9, and 10; or for the TDD uplink-downlink configuration 6, when n is 6, then $k_{PHICH}$ is one of 3, 4, 5, 9, and 10;

wherein the TDD uplink-downlink configuration is an uplink reference TDD uplink-downlink configuration, or a TDD uplink-downlink configuration configured in system information.

Optionally for the TDD uplink-downlink configuration 1, when the subframe $n+k_{PHICH}$ is the subframe 0 or 5, or for the TDD uplink-downlink configuration 2, when the subframe $n+k_{PHICH}$ is the subframe 0, 1, 4, 5, 6, or 9, or for the TDD uplink-downlink configuration 3, when the subframe $n+k_{PHICH}$ is the subframe 1, 5, 6, or 7, or for the TDD uplink-downlink configuration 4, when the subframe $n+k_{PHICH}$ is the subframe 0, 1, 4, 5, 6, or 7, or for the TDD uplink-downlink configuration 5, when the subframe $n+k_{PHICH}$ is the subframe 0, 1, 3, 4, 5, 6, 7, or 9, then the subframe $n+k_{PHICH}$ includes $m_i * N_{PHICH}^{group}$ groups of PHICHs, wherein $m_i$ is 1;

wherein i is a subframe index of the subframe $n+k_{PHICH}$, and $N_{PHICH}^{group}$ is the number of PHICH groups determined according to a parameter configured in high-layer signaling.

Optionally the first receiving module is configured:

to determine $I_{PHICH}$ corresponding to the PUSCH transmitted in the special subframe n to be $I_{PHICH}=0$, and to determine a PHICH resource, corresponding to the PUSCH, in the subframe $n+k_{PHICH}$ according to the value of $I_{PHICH}$; and to receive the PHICH corresponding to the PUSCH in the subframe $n+k_{PHICH}$ according to the determined PHICH resource;

wherein $I_{PHICH}$ is a parameter for determining the PHICH resource.

Optionally for the TDD uplink-downlink configuration 0, when $k_{PHICH}$ is 4, 5, 9, or 10, or for the TDD uplink-downlink configuration 1, when $k_{PHICH}$ is 3, 5, 8, or 10, or for the TDD uplink-downlink configuration 2, when $k_{PHICH}$ is 2 or 7, or for the TDD uplink-downlink configuration 3, when $k_{PHICH}$ is 7, 8, or 9, or for the TDD uplink-downlink configuration 4, when $k_{PHICH}$ is 7 or 8, or for the TDD uplink-downlink configuration 5, when $k_{PHICH}$ is 7, or for the TDD uplink-downlink configuration 6, when $k_{PHICH}$ is 3, 4, 5, 8, 9, or 10, then the subframe $n+k_{PHICH}$ includes $m_i * N_{PHICH}^{group}$ groups of PHICHs, wherein $m_i$ is a value defined in the 3GPP TS 36.211;

wherein i is a subframe index of the subframe $n+k_{PHICH}$, $m_i$ is a coefficient for determining the number of PHICH groups corresponding to a subframe i in a TDD system, and $N_{PHICH}^{group}$ is the number of PHICH groups determined according to a parameter configured in high-layer signaling.

Optionally the first receiving module is configured:

to determine a PHICH resource, corresponding to the PUSCH transmitted in the special subframe n, in the subframe $n+k_{PHICH}$ according to a lowest PRB index of the PUSCH transmitted in the special subframe n, DMRS cyclic shift information indicated in scheduling information of the PUSCH, and a prescribed or preconfigured value of $I_{PHICH}$ corresponding to the PUSCH transmitted in the special subframe n; and to receive the PHICH corresponding to the PUSCH in the subframe $n+k_{PHICH}$ according to the determined PHICH resource;

wherein the lowest PRB index of the PUSCH transmitted in the special subframe n is different from the lowest PRB index of a PUSCH transmitted in a corresponding uplink subframe for which the PHICH is received according to the value of $I_{PHICH}$ in the subframe $n+k_{PHICH}$, and/or the DMRS cyclic shift information indicated in the scheduling information of the PUSCH transmitted in the special subframe n is different from DMRS cyclic shift information indicated in scheduling information of a PUSCH transmitted in a corresponding uplink subframe for which the PHICH is received according to the value of $I_{PHICH}$ in the subframe $n+k_{PHICH}$.

Optionally for the TDD uplink-downlink configuration 0, when the subframe $n+k_{PHICH}$ is the subframe 1 or 6, or for the TDD uplink-downlink configuration 1, when the subframe $n+k_{PHICH}$ is the subframe 1, 4, 6, or 9, or for the TDD uplink-downlink configuration 2, when the subframe $n+k_{PHICH}$ is the subframe 3 or 8, or for the TDD uplink-downlink configuration 3, when the subframe $n+k_{PHICH}$ is the subframe 0, 8, or 9, or for the TDD uplink-downlink configuration 4, when the subframe $n+k_{PHICH}$ is the subframe 8 or 9, or for the TDD uplink-downlink configuration 5, when the subframe $n+k_{PHICH}$ is the subframe 8, or for the TDD uplink-downlink configuration 6, when the subframe $n+k_{PHICH}$ is the subframe 0, 1, 5, 6, or 9, then the subframe $n+k_{PHICH}$ includes $m_i * N_{PHICH}^{group}$ groups of PHICHs, wherein $m_i$ is 2;

wherein i is a subframe index of the subframe $n+k_{PHICH}$, and $N_{PHICH}^{group}$ is the number of PHICH groups determined according to a parameter configured in high-layer signaling.

Optionally the first receiving module is configured:

to determine $I_{PHICH}$ corresponding to the PUSCH transmitted in the special subframe n to be $I_{PHICH}=1$, and to determine a PHICH resource, corresponding to the PUSCH, in the subframe $n+k_{PHICH}$ according to a value of $I_{PHICH}$; and to receive the PHICH corresponding to the PUSCH in the subframe $n+k_{PHICH}$ according to the determined PHICH resource;

wherein $I_{PHICH}$ is a parameter for determining the PHICH resource.

Optionally for the TDD uplink-downlink configuration 0, when the subframe $n+k_{PHICH}$ is the subframe 0 or 5, then the subframe $n+k_{PHICH}$ includes $m_i * N_{PHICH}^{group}$ groups of PHICHs, wherein $m_i$ is 3;

wherein i is a subframe index of the subframe $n+k_{PHICH}$, and $N_{PHICH}^{group}$ is the number of PHICH groups determined according to a parameter configured in high-layer signaling.

Optionally the first receiving module is configured:

to determine $I_{PHICH}$ corresponding to the PUSCH transmitted in the special subframe n to be $I_{PHICH}=2$, and to determine a PHICH resource, corresponding to the PUSCH, in the subframe $n+k_{PHICH}$ according to the value of $I_{PHICH}$; and to receive the PHICH corresponding to the PUSCH in the subframe $n+k_{PHICH}$ according to the determined PHICH resource;

wherein $I_{PHICH}$ is a parameter for determining the PHICH resource.

In a fourth aspect, an embodiment of the invention provides a first network-side device for transmitting feedback information, the network-side device including:

a second receiving module configured to receive a PUSCH in a special subframe n; and a feedback module configured to transmit a PHICH corresponding to the PUSCH in a subframe $n+k_{PHICH}$, wherein the PHICH carries feedback information of the PUSCH, and $k_{PHICH}$ is a prescribed or preconfigured value.

Optionally for the TDD uplink-downlink configuration 0, when n is 1 or 6, then $k_{PHICH}$ is one of 4, 5, 9, and 10; or for the TDD uplink-downlink configuration 1, when n is 1 or 6, then $k_{PHICH}$ is one of 3, 4, 5, 8, 9, and 10; or for the TDD uplink-downlink configuration 2, when n is 1 or 6, then $k_{PHICH}$ is one of 2, 3, 4, 5, 7, 8, 9, and 10; or for the TDD uplink-downlink configuration 3, when n is 1, then $k_{PHICH}$ is one of 4, 5, 6, 7, 8, 9, and 10; or for the TDD uplink-downlink configuration 4, when n is 1, then $k_{PHICH}$ is one of 3, 4, 5, 6, 7, 8, 9, and 10; or for the TDD uplink-downlink configuration 5, when n is 1, then $k_{PHICH}$ is one of 2, 3, 4, 5, 6, 7, 8, 9, and 10; or for the TDD uplink-downlink configuration 6, when n is 1, then $k_{PHICH}$ is one of 4, 5, 8, 9, and 10; or for the TDD uplink-downlink configuration 6, when n is 6, then $k_{PHICH}$ is one of 3, 4, 5, 9, and 10;

wherein the TDD uplink-downlink configuration is an uplink reference TDD uplink-downlink configuration, or a TDD uplink-downlink configuration configured in system information.

Optionally for the TDD uplink-downlink configuration 1, when the subframe $n+k_{PHICH}$ is the subframe 0 or 5, or for the TDD uplink-downlink configuration 2, when the subframe $n+k_{PHICH}$ is the subframe 0, 1, 4, 5, 6, or 9, or for the TDD uplink-downlink configuration 3, when the subframe $n+k_{PHICH}$ is the subframe 1, 5, 6, or 7, or for the TDD uplink-downlink configuration 4, when the subframe $n+k_{PHICH}$ is the subframe 0, 1, 4, 5, 6, or 7, or for the TDD uplink-downlink configuration 5, when the subframe $n+k_{PHICH}$ is the subframe 0, 1, 3, 4, 5, 6, 7, or 9, then the subframe $n+k_{PHICH}$ includes $m_i*N_{PHICH}^{group}$ groups of PHICHs, wherein $m_i$ is 1;

wherein i is a subframe index of the subframe $n+k_{PHICH}$, and $N_{PHICH}^{group}$ is the number of PHICH groups determined according to a parameter configured in high-layer signaling.

Optionally the feedback module is configured:

to determine $I_{PHICH}$ corresponding to the PUSCH transmitted in the special subframe n to be $I_{PHICH}=0$, and to determine a PHICH resource, corresponding to the PUSCH, in the subframe $n+k_{PHICH}$ according to a value of $I_{PHICH}$; and to transmit the PHICH corresponding to the PUSCH in the subframe $n+k_{PHICH}$ according to the determined PHICH resource;

wherein $I_{PHICH}$ is a parameter for determining the PHICH resource.

Optionally for the TDD uplink-downlink configuration 0, when $k_{PHICH}$ is 4, 5, 9, or 10, or for the TDD uplink-downlink configuration 1, when $k_{PHICH}$ is 3, 5, 8, or 10, or for the TDD uplink-downlink configuration 2, when $k_{PHICH}$ is 2 or 7, or for the TDD uplink-downlink configuration 3, when $k_{PHICH}$ is 7, 8, or 9, or for the TDD uplink-downlink configuration 4, when $k_{PHICH}$ is 7 or 8, or for the TDD uplink-downlink configuration 5, when $k_{PHICH}$ is 7, or for the TDD uplink-downlink configuration 6, when $k_{PHICH}$ is 3, 4, 5, 8, 9, or 10, then the subframe $n+k_{PHICH}$ includes $m_i*N_{PHICH}^{group}$ groups of PHICHs, wherein $m_i$ is a value defined in the 3GPP TS 36.211;

wherein i is a subframe index of the subframe $n+k_{PHICH}$, $m_i$ is a coefficient for determining the number of PHICH groups corresponding to a subframe i in a TDD system, and $N_{PHICH}^{group}$ is the number of PHICH groups determined according to a parameter configured in high-layer signaling.

Optionally the feedback module is configured:

to determine a PHICH resource, corresponding to the PUSCH transmitted in the special subframe n, in the subframe $n+k_{PHICH}$ according to a lowest PRB index of the PUSCH transmitted in the special subframe n, DMRS cyclic shift information indicated in scheduling information of the PUSCH, and a prescribed or preconfigured value of $I_{PHICH}$ corresponding to the PUSCH transmitted in the special subframe n; and to transmit the PHICH corresponding to the PUSCH in the subframe $n+k_{PHICH}$ according to the determined PHICH resource;

wherein the lowest PRB index of the PUSCH transmitted in the special subframe n is different from a lowest PRB index of a PUSCH transmitted in a corresponding uplink subframe for which the PHICH is transmitted according to the value of $I_{PHICH}$ in the subframe $n+k_{PHICH}$, and/or the DMRS cyclic shift information indicated in the scheduling information of the PUSCH transmitted in the special subframe n is different from DMRS cyclic shift information indicated in scheduling information of a PUSCH transmitted in a corresponding uplink subframe for which the PHICH is received according to the value of $I_{PHICH}$ in the subframe $n+k_{PHICH}$.

Optionally for the TDD uplink-downlink configuration 0, when the subframe $n+k_{PHICH}$ is the subframe 1 or 6, or for the TDD uplink-downlink configuration 1, when the subframe $n+k_{PHICH}$ is the subframe 1, 4, 6, or 9, or for the TDD uplink-downlink configuration 2, when the subframe $n+k_{PHICH}$ is the subframe 3 or 8, or for the TDD uplink-downlink configuration 3, when the subframe $n+k_{PHICH}$ is the subframe 0, 8, or 9, or for the TDD uplink-downlink configuration 4, when the subframe $n+k_{PHICH}$ is the subframe 8 or 9, or for the TDD uplink-downlink configuration 5, when the subframe $n+k_{PHICH}$ is the subframe 8, or for the TDD uplink-downlink configuration 6, when the subframe $n+k_{PHICH}$ is the subframe 0, 1, 5, 6, or 9, then the subframe $n+k_{PHICH}$ includes $m_i*N_{PHICH}^{group}$ groups of PHICHs, wherein $m_i$ is 2;

wherein i is a subframe index of the subframe $n+k_{PHICH}$, and $N_{PHICH}^{group}$ is the number of PHICH groups determined according to a parameter configured in high-layer signaling.

Optionally the feedback module is configured:

to determine $I_{PHICH}$ corresponding to the PUSCH transmitted in the special subframe n to be $I_{PHICH}=1$, and to determine a PHICH resource, corresponding to the PUSCH, in the subframe $n+k_{PHICH}$ according to a value of $I_{PHICH}$; and to transmit the PHICH corresponding to the PUSCH in the subframe $n+k_{PHICH}$ according to the determined PHICH resource;

wherein $I_{PHICH}$ is a parameter for determining the PHICH resource.

Optionally for the TDD uplink-downlink configuration 0, when the subframe $n+k_{PHICH}$ is the subframe 0 or 5, then the subframe $n+k_{PHICH}$ includes $m_i*N_{PHICH}^{group}$ groups of PHICHs, wherein $m_i$ is 3;

wherein i is a subframe index of the subframe $n+k_{PHICH}$, and $N_{PHICH}^{group}$ is the number of PHICH groups determined according to a parameter configured in high-layer signaling.

Optionally the feedback module is configured:

to determine $I_{PHICH}$ corresponding to the PUSCH transmitted in the special subframe n to be $I_{PHICH}=2$, and to determine a PHICH resource, corresponding to the PUSCH, in the subframe $n+k_{PHICH}$ according to a value of $I_{PHICH}$; and to transmit the PHICH corresponding to the PUSCH in the subframe $n+k_{PHICH}$ according to the determined PHICH resource;

wherein $I_{PHICH}$ is a parameter for determining the PHICH resource.

In a fifth aspect, an embodiment of the invention provides a second UE for receiving feedback information, the UE including a processor, a transceiver, and a memory, wherein:

the processor is configured to read and execute program in the memory:

to transmit a PUSCH in a special subframe n through the transceiver; and to receive a PHICH corresponding to the PUSCH in a subframe $n+k_{PHICH}$ through the transceiver, wherein the PHICH carries feedback information of the PUSCH, and $k_{PHICH}$ is a prescribed or preconfigured value; and the transceiver is configured to receive and transmit data under the control of the processor.

Optionally for the TDD uplink-downlink configuration 0, when n is 1 or 6, then $k_{PHICH}$ is one of 4, 5, 9, and 10; or for the TDD uplink-downlink configuration 1, when n is 1 or 6, then $k_{PHICH}$ is one of 3, 4, 5, 8, 9, and 10; or for the TDD uplink-downlink configuration 2, when n is 1 or 6, then $k_{PHICH}$ is one of 2, 3, 4, 5, 7, 8, 9, and 10; or for the TDD uplink-downlink configuration 3, when n is 1, then $k_{PHICH}$ is one of 4, 5, 6, 7, 8, 9, and 10; or for the TDD uplink-downlink configuration 4, when n is 1, then $k_{PHICH}$ is one of 3, 4, 5, 6, 7, 8, 9, and 10; or for the TDD uplink-downlink configuration 5, when n is 1, then $k_{PHICH}$ is one of 2, 3, 4, 5, 6, 7, 8, 9, and 10; or for the TDD uplink-downlink configuration 6, when n is 1, then $k_{PHICH}$ is one of 4, 5, 8, 9, and 10; or for the TDD uplink-downlink configuration 6, when n is 6, then $k_{PHICH}$ is one of 3, 4, 5, 9, and 10;

wherein the TDD uplink-downlink configuration is an uplink reference TDD uplink-downlink configuration, or a TDD uplink-downlink configuration configured in system information.

Optionally for the TDD uplink-downlink configuration 1, when the subframe $n+k_{PHICH}$ is the subframe 0 or 5, or for the TDD uplink-downlink configuration 2, when the subframe $n+k_{PHICH}$ is the subframe 0, 1, 4, 5, 6, or 9, or for the TDD uplink-downlink configuration 3, when the subframe $n+k_{PHICH}$ is the subframe 1, 5, 6, or 7, or for the TDD uplink-downlink configuration 4, when the subframe $n+k_{PHICH}$ is the subframe 0, 1, 4, 5, 6, or 7, or for the TDD uplink-downlink configuration 5, when the subframe $n+k_{PHICH}$ is the subframe 0, 1, 3, 4, 5, 6, 7, or 9, then the subframe $n+k_{PHICH}$ includes $m_i * N_{PHICH}^{group}$ groups of PHICHs, wherein $m_i$ is 1;

wherein i is a subframe index of the subframe $n+k_{PHICH}$, and $N_{PHICH}^{group}$ is the number of PHICH groups determined according to a parameter configured in high-layer signaling.

Optionally the processor is configured:

to determine $I_{PHICH}$ corresponding to the PUSCH transmitted in the special subframe n to be $I_{PHICH}=0$, and to determine a PHICH resource, corresponding to the PUSCH, in the subframe $n+k_{PHICH}$ according to the value of $I_{PHICH}$; and to receive the PHICH corresponding to the PUSCH in the subframe $n+k_{PHICH}$ according to the determined PHICH resource;

wherein $I_{PHICH}$ is a parameter for determining the PHICH resource.

Optionally for the TDD uplink-downlink configuration 0, when $k_{PHICH}$ is 4, 5, 9, or 10, or for the TDD uplink-downlink configuration 1, when $k_{PHICH}$ is 3, 5, 8, or 10, or for the TDD uplink-downlink configuration 2, when $k_{PHICH}$ is 2 or 7, or for the TDD uplink-downlink configuration 3, when $k_{PHICH}$ is 7, 8, or 9, or for the TDD uplink-downlink configuration 4, when $k_{PHICH}$ is 7 or 8, or for the TDD uplink-downlink configuration 5, when $k_{PHICH}$ is 7, or for the TDD uplink-downlink configuration 6, when $k_{PHICH}$ is 3, 4, 5, 8, 9, or 10, then the subframe $n+k_{PHICH}$ includes $m_i * N_{PHICH}^{group}$ groups of PHICHs, wherein $m_i$ is a value defined in the 3GPP TS 36.211;

wherein i is a subframe index of the subframe $n+k_{PHICH}$, $m_i$ is a coefficient for determining the number of PHICH groups corresponding to a subframe i in a TDD system, and $N_{PHICH}^{group}$ is the number of PHICH groups determined according to a parameter configured in high-layer signaling.

Optionally the processor is configured:

to determine a PHICH resource, corresponding to the PUSCH transmitted in the special subframe n, in the subframe $n+k_{PHICH}$ according to a lowest PRB index of the PUSCH transmitted in the special subframe n, DMRS cyclic shift information indicated in scheduling information of the PUSCH, and a prescribed or preconfigured value of $I_{PHICH}$ corresponding to the PUSCH transmitted in the special subframe n; and to receive the PHICH corresponding to the PUSCH in the subframe $n+k_{PHICH}$ according to the determined PHICH resource;

wherein the lowest PRB index of the PUSCH transmitted in the special subframe n is different from a lowest PRB index of a PUSCH transmitted in a corresponding uplink subframe for which the PHICH is received according to the value of $I_{PHICH}$ in the subframe $n+k_{PHICH}$, and/or the DMRS cyclic shift information indicated in the scheduling information of the PUSCH transmitted in the special subframe n is different from DMRS cyclic shift information indicated in scheduling information of a PUSCH transmitted in a corresponding uplink subframe for which the PHICH is received according to the value of $I_{PHICH}$ in the subframe $n+k_{PHICH}$.

Optionally for the TDD uplink-downlink configuration 0, when the subframe $n+k_{PHICH}$ is the subframe 1 or 6, or for the TDD uplink-downlink configuration 1, when the subframe $n+k_{PHICH}$ is the subframe 1, 4, 6, or 9, or for the TDD uplink-downlink configuration 2, when the subframe $n+k_{PHICH}$ is the subframe 3 or 8, or for the TDD uplink-downlink configuration 3, when the subframe $n+k_{PHICH}$ is the subframe 0, 8, or 9, or for the TDD uplink-downlink configuration 4, when the subframe $n+k_{PHICH}$ is the subframe 8 or 9, or for the TDD uplink-downlink configuration 5, when the subframe $n+k_{PHICH}$ is the subframe 8, or for the TDD uplink-downlink configuration 6, when the subframe $n+k_{PHICH}$ is the subframe 0, 1, 5, 6, or 9, then the subframe $n+k_{PHICH}$ includes $m_i * N_{PHICH}^{group}$ groups of PHICHs, wherein $m_i$ is 2;

wherein i is a subframe index of the subframe $n+k_{PHICH}$, and $N_{PHICH}^{group}$ is the number of PHICH groups determined according to a parameter configured in high-layer signaling.

Optionally the processor is configured:

to determine $I_{PHICH}$ corresponding to the PUSCH transmitted in the special subframe n to be $I_{PHICH}=1$, and to determine a PHICH resource, corresponding to the PUSCH, in the subframe $n+k_{PHICH}$ according to a value of $I_{PHICH}$; and to receive the PHICH corresponding to the PUSCH in the subframe $n+k_{PHICH}$ according to the determined PHICH resource;

wherein $I_{PHICH}$ is a parameter for determining the PHICH resource.

Optionally for the TDD uplink-downlink configuration 0, when the subframe n+$k_{PHICH}$ is the subframe 0 or 5, then the subframe n+$k_{PHICH}$ includes $m_i*N_{PHICH}^{group}$ groups of PHICHs, wherein $m_i$ is 3;

wherein i is a subframe index of the subframe n+$k_{PHICH}$, and $N_{PHICH}^{group}$ is the number of PHICH groups determined according to a parameter configured in high-layer signaling.

Optionally the processor is configured:

to determine $I_{PHICH}$ corresponding to the PUSCH transmitted in the special subframe n to be $I_{PHICH}$=2, and to determine a PHICH resource, corresponding to the PUSCH, in the subframe n+$k_{PHICH}$ according to a value of $I_{PHICH}$; and to receive the PHICH corresponding to the PUSCH in the subframe n+$k_{PHICH}$ according to the determined PHICH resource;

wherein $I_{PHICH}$ is a parameter for determining the PHICH resource.

In a sixth aspect, an embodiment of the invention provides a second network-side device for transmitting feedback information, the network-side device including a processor, a transceiver, and a memory, wherein:

the processor is configured to read and execute program in the memory:

to receive a PUSCH in a special subframe n through the transceiver; and to transmit a PHICH corresponding to the PUSCH in a subframe n+$k_{PHICH}$ through the transceiver, wherein the PHICH carries feedback information of the PUSCH, and $k_{PHICH}$ is a prescribed or preconfigured value; and the transceiver is configured to receive and transmit data under the control of the processor.

Optionally for the TDD uplink-downlink configuration 0, when n is 1 or 6, then $k_{PHICH}$ is one of 4, 5, 9, and 10; or for the TDD uplink-downlink configuration 1, when n is 1 or 6, then $k_{PHICH}$ is one of 3, 4, 5, 8, 9, and 10; or for the TDD uplink-downlink configuration 2, when n is 1 or 6, then $k_{PHICH}$ is one of 2, 3, 4, 5, 7, 8, 9, and 10; or for the TDD uplink-downlink configuration 3, when n is 1, then $k_{PHICH}$ is one of 4, 5, 6, 7, 8, 9, and 10; or for the TDD uplink-downlink configuration 4, when n is 1, then $k_{PHICH}$ is one of 3, 4, 5, 6, 7, 8, 9, and 10; or for the TDD uplink-downlink configuration 5, when n is 1, then $k_{PHICH}$ is one of 2, 3, 4, 5, 6, 7, 8, 9, and 10; or for the TDD uplink-downlink configuration 6, when n is 1, then $k_{PHICH}$ is one of 4, 5, 8, 9, and 10; or for the TDD uplink-downlink configuration 6, when n is 6, then $k_{PHICH}$ is one of 3, 4, 5, 9, and 10;

wherein the TDD uplink-downlink configuration is an uplink reference TDD uplink-downlink configuration, or a TDD uplink-downlink configuration configured in system information.

Optionally for the TDD uplink-downlink configuration 1, when the subframe n+$k_{PHICH}$ is the subframe 0 or 5, or for the TDD uplink-downlink configuration 2, when the subframe n+$k_{PHICH}$ is the subframe 0, 1, 4, 5, 6, or 9, or for the TDD uplink-downlink configuration 3, when the subframe n+$k_{PHICH}$ is the subframe 1, 5, 6, or 7, or for the TDD uplink-downlink configuration 4, when the subframe n+$k_{PHICH}$ is the subframe 0, 1, 4, 5, 6, or 7, or for the TDD uplink-downlink configuration 5, when the subframe n+$k_{PHICH}$ is the subframe 0, 1, 3, 4, 5, 6, 7, or 9, then the subframe n+$k_{PHICH}$ includes $m_i*N_{PHICH}^{group}$ groups of PHICHs, wherein $m_i$ is 1;

wherein i is a subframe index of the subframe n+$k_{PHICH}$, and $N_{PHICH}^{group}$ is the number of PHICH groups determined according to a parameter configured in high-layer signaling.

Optionally the processor is configured:

to determine $I_{PHICH}$ corresponding to the PUSCH transmitted in the special subframe n to be $I_{PHICH}$=0, and to determine a PHICH resource, corresponding to the PUSCH, in the subframe n+$k_{PHICH}$ according to the value of $I_{PHICH}$; and to transmit the PHICH corresponding to the PUSCH in the subframe n+$k_{PHICH}$ according to the determined PHICH resource;

wherein $I_{PHICH}$ is a parameter for determining the PHICH resource.

Optionally for the TDD uplink-downlink configuration 0, when $k_{PHICH}$ is 4, 5, 9, or 10, or for the TDD uplink-downlink configuration 1, when $k_{PHICH}$ is 3, 5, 8, or 10, or for the TDD uplink-downlink configuration 2, when $k_{PHICH}$ is 2 or 7, or for the TDD uplink-downlink configuration 3, when $k_{PHICH}$ is 7, 8, or 9, or for the TDD uplink-downlink configuration 4, when $k_{PHICH}$ is 7 or 8, or for the TDD uplink-downlink configuration 5, when $k_{PHICH}$ is 7, or for the TDD uplink-downlink configuration 6, when $k_{PHICH}$ is 3, 4, 5, 8, 9, or 10, then the subframe n+$k_{PHICH}$ includes $m_i*N_{PHICH}^{group}$ groups of PHICHs, wherein $m_i$ is a value defined in the 3GPP TS 36.211;

wherein i is a subframe index of the subframe n+$k_{PHICH}$, $m_i$ is a coefficient for determining the number of PHICH groups corresponding to a subframe i in a TDD system, and $N_{PHICH}^{group}$ is the number of PHICH groups determined according to a parameter configured in high-layer signaling.

Optionally the processor is configured:

to determine a PHICH resource, corresponding to the PUSCH transmitted in the special subframe n, in the subframe n+$k_{PHICH}$ according to a lowest PRB index of the PUSCH transmitted in the special subframe n, DMRS cyclic shift information indicated in scheduling information of the PUSCH, and a prescribed or preconfigured value of $I_{PHICH}$ corresponding to the PUSCH transmitted in the special subframe n; and to transmit the PHICH corresponding to the PUSCH in the subframe n+$k_{PHICH}$ according to the determined PHICH resource;

wherein the lowest PRB index of the PUSCH transmitted in the special subframe n is different from a lowest PRB index of a PUSCH transmitted in a corresponding uplink subframe for which the PHICH is transmitted according to the value of $I_{PHICH}$ in the subframe n+$k_{PHICH}$, and/or the DMRS cyclic shift information indicated in the scheduling information of the PUSCH transmitted in the special subframe n is different from DMRS cyclic shift information indicated in scheduling information of a PUSCH transmitted in a corresponding uplink subframe for which the PHICH is received according to the value of $I_{PHICH}$ in the subframe n+$k_{PHICH}$.

Optionally for the TDD uplink-downlink configuration 0, when the subframe n+$k_{PHICH}$ is the subframe 1 or 6, or for the TDD uplink-downlink configuration 1, when the subframe n+$k_{PHICH}$ is the subframe 1, 4, 6, or 9, or for the TDD uplink-downlink configuration 2, when the subframe n+$k_{PHICH}$ is the subframe 3 or 8, or for the TDD uplink-downlink configuration 3, when the subframe n+$k_{PHICH}$ is the subframe 0, 8, or 9, or for the TDD uplink-downlink configuration 4, when the subframe n+$k_{PHICH}$ is the subframe 8 or 9, or for the TDD uplink-downlink configuration 5, when the subframe n+$k_{PHICH}$ is the subframe 8, or for the TDD uplink-downlink configuration 6, when the subframe n+$k_{PHICH}$ is the subframe 0, 1, 5, 6, or 9, then the subframe n+$k_{PHICH}$ includes $m_i*N_{PHICH}^{group}$ groups of PHICHs, wherein $m_i$ is 2;

wherein i is a subframe index of the subframe $n+k_{PHICH}$, and $N_{PHICH}^{group}$ is the number of PHICH groups determined according to a parameter configured in high-layer signaling.

Optionally the processor is configured:

to determine $I_{PHICH}$ corresponding to the PUSCH transmitted in the special subframe n to be $I_{PHICH}=1$, and to determine a PHICH resource, corresponding to the PUSCH, in the subframe $n+k_{PHICH}$ according to a value of $I_{PHICH}$; and to transmit the PHICH corresponding to the PUSCH in the subframe $n+k_{PHICH}$ according to the determined PHICH resource;

wherein $I_{PHICH}$ is a parameter for determining the PHICH resource.

Optionally for the TDD uplink-downlink configuration 0, when the subframe $n+k_{PHICH}$ is the subframe 0 or 5, then the subframe $n+k_{PHICH}$ includes $m_i * N_{PHICH}^{group}$ groups of PHICHs, wherein $m_i$ is 3;

wherein i is a subframe index of the subframe $n+k_{PHICH}$, and $N_{PHICH}^{group}$ is the number of PHICH groups determined according to a parameter configured in high-layer signaling.

Optionally the processor is configured:

to determine $I_{PHICH}$ corresponding to the PUSCH transmitted in the special subframe n to be $I_{PHICH}=2$, and to determine a PHICH resource, corresponding to the PUSCH, in the subframe $n+k_{PHICH}$ according to a value of $I_{PHICH}$; and to transmit the PHICH corresponding to the PUSCH in the subframe $n+k_{PHICH}$ according to the determined PHICH resource;

wherein $I_{PHICH}$ is a parameter for determining the PHICH resource.

In the embodiments of the invention, a UE transmits a PUSCH in a special subframe n, and receives a PHICH corresponding to the PUSCH in a subframe $n+k_{PHICH}$, where the PHICH carries feedback information of the PUSCH; and a network-side device receives the PUSCH in the special subframe n, and transmits the PHICH corresponding to the PSUCH in the subframe $n+k_{PHICH}$, so that ACK/NACK can be fed back for the PUSCH transmitted in an UpPTS.

BRIEF DESCRIPTION OF THE DRAWINGS

In order to make the technical solutions according to the embodiments of the invention more apparent, the drawings to which reference will be made in the description of the embodiments will be introduced below briefly, and apparently the drawings to be described below illustrate only some embodiments of the invention, and those ordinarily skilled in the art can further derive other drawings from these drawings without any inventive effort.

DETAILED DESCRIPTION

In the embodiments of the invention, a UE transmits a Physical Uplink Shared Channel (PUSCH) in a special subframe n, and receives a Physical Hybrid Automatic Repeat Request (HARQ) Indicating Channel (PHICH) corresponding to the PUSCH in a subframe $n+k_{PHICH}$, where the PHICH carries feedback information of the PUSCH; and a network-side device receives the PUSCH in the special subframe n, and transmits the PHICH corresponding to the PSUCH in the subframe $n+k_{PHICH}$, so that ACK/NACK can be fed back for the PUSCH transmitted in an UpPTS.

In order to make the objects, technical solutions, and advantages of the embodiments of the invention more apparent, the invention will be described below in further details with reference to the drawings, and apparently the embodiments to be described are only a part but not all of the embodiments of the invention. Based upon the embodiments here of the invention, all the other embodiments which can occur to those ordinarily skilled in the art without any inventive effort shall fall into the claimed scope of the invention.

Figure 1:
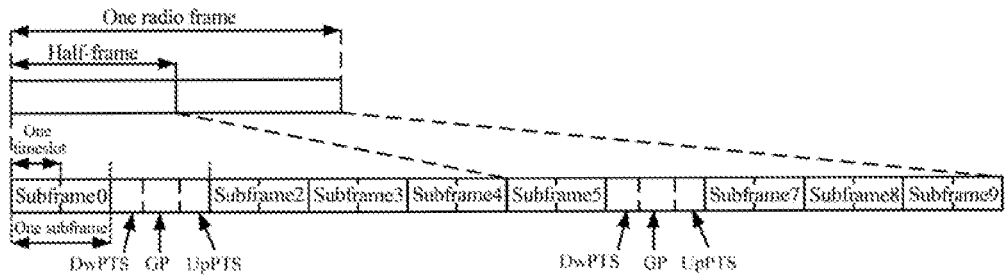
FIG. 1 is a schematic diagram of the frame structure applicable to the LTE TDD system in the prior art.
Figure 2:
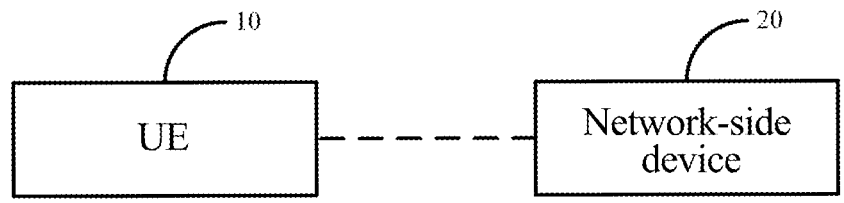
FIG. 2 is a schematic structural diagram of a system for transmitting feedback information according to an embodiment of the invention.

As illustrated in FIG. 2, a system for transmitting feedback information according to an embodiment of the invention includes: a UE 10 and a network-side device 20.

The UE 10 is configured to transmit a PUSCH in a special subframe n, and to receive a PHICH corresponding to the PUSCH in a subframe $n+k_{PHICH}$, where the PHICH carries feedback information of the PUSCH, and $k_{PHICH}$ is a prescribed or preconfigured value.

The network-side device 20 is configured to receive the PUSCH in the special subframe n, and to transmit the PHICH corresponding to the PSUCH in the subframe $n+k_{PHICH}$.

In an implementation, $k_{PHICH}$ is a value which is set to satisfy a required delay, and the required delay is a period of time taken to parse the PUSCH and to generate the feedback information, upon reception of the PUSCH, and generally related to an implementation.

Optionally for the TDD uplink-downlink configuration 0, when n is 1 or 6, then $k_{PHICH}$ is one of 4, 5, 9, and 10; or For the TDD uplink-downlink configuration 1, when n is 1 or 6, then $k_{PHICH}$ is one of 3, 4, 5, 8, 9, and 10; or For the TDD uplink-downlink configuration 2, when n is 1 or 6, then $k_{PHICH}$ is one of 2, 3, 4, 5, 7, 8, 9, and 10; or For the TDD uplink-downlink configuration 3, when n is 1, then $k_{PHICH}$ is one of 4, 5, 6, 7, 8, 9, and 10; or For the TDD uplink-downlink configuration 4, when n is 1, then $k_{PHICH}$ is one of 3, 4, 5, 6, 7, 8, 9, and 10; or For the TDD uplink-downlink configuration 5, when n is 1, then $k_{PHICH}$ is one of 2, 3, 4, 5, 6, 7, 8, 9, and 10; or For the TDD uplink-downlink configuration 6, when n is 1, then $k_{PHICH}$ is one of 4, 5, 8, 9, and 10; or For the TDD uplink-downlink configuration 6, when n is 6, then $k_{PHICH}$ is one of 3, 4, 5, 9, and 10.

Here the TDD uplink-downlink configuration is an uplink reference TDD uplink-downlink configuration, or a TDD uplink-downlink configuration configured in system information.

Reference can be made to Table 2 for the description above.

TABLE 2

| TDD uplink-downlink configuration | Subframe index n | | | | | | | | | |
|---|---|---|---|---|---|---|---|---|---|---|
| | 0 | 1 | 2 | 3 | 4 | 5 | 6 | 7 | 8 | 9 |
| 0 | | 4 or 5 or 9 or 10 | | | | | 4 or 5 or 9 or 10 | | | |
| 1 | | 3 or 4 or 5 or 8 or 9 or 10 | | | | | 3 or 4 or 5 or 8 or 9 or 10 | | | |
| 2 | | 2 or 3 or 4 or 5 or 7 or 8 or 9 or 10 | | | | | 2 or 3 or 4 or 5 or 7 or 8 or 9 or 10 | | | |
| 3 | | 4 or 5 or 6 or 7 or 8 or 9 or 10 | | | | | | | | |
| 4 | | 3 or 4 or 5 or 6 or 7 or 8 or 9 or 10 | | | | | | | | |
| 5 | | 2 or 3 or 4 or 5 or 6 or 7 or 8 or 9 or 10 | | | | | | | | |
| 6 | | 4 or 5 or 8 or 9 or 10 | | | | | 3 or 4 or 5 or 9 or 10 | | | |

For different configurations, the size of a PHICH resource in the subframe $n+k_{PHICH}$ is also different, and this will be described below respectively.

In a first scheme, for the TDD uplink-downlink configuration 1, when the subframe $n+k_{PHICH}$ is the subframe 0 or 5, or for the TDD uplink-downlink configuration 2, when the subframe $n+k_{PHICH}$ is the subframe 0, 1, 4, 5, 6, or 9, or for the TDD uplink-downlink configuration 3, when the subframe $n+k_{PHICH}$ is the subframe 1, 5, 6, or 7, or for the TDD uplink-downlink configuration 4, when the subframe $n+k_{PHICH}$ is the subframe 0, 1, 4, 5, 6, or 7, or for the TDD uplink-downlink configuration 5, when the subframe $n+k_{PHICH}$ is the subframe 0, 1, 3, 4, 5, 6, 7, or 9, then the subframe $n+k_{PHICH}$ includes $m_i * N_{PHICH}^{group}$ groups of PHICHs, where $m_i$ is 1.

Where i is the subframe index of the subframe $n+k_{PHICH}$, and $N_{PHICH}^{group}$ is the number of PHICH groups determined according to a parameter configured in high-layer signaling.

For example, $$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases},$$

where $N_g \in \{1/6, 1/2, 1, 2\}$ is a value preconfigured in high-layer signaling, and $N_{RB}^{DL}$ is a downlink bandwidth in RBs; and the same definition of $N_{PHICH}^{group}$ applies hereinafter, so a repeated description thereof will be omitted.

Correspondingly the network-side device determines $I_{PHICH}=0$ corresponding to the PUSCH transmitted in the special subframe n, and determines a PHICH resource, corresponding to the PUSCH, in the subframe $n+k_{PHICH}$ according to the value of $I_{PHICH}$; and transmits the PHICH corresponding to the PUSCH in the subframe $n+k_{PHICH}$ according to the determined PHICH resource.

The UE determines $I_{PHICH}=0$ corresponding to the PUSCH transmitted in the special subframe n, and determines the PHICH resource, corresponding to the PUSCH, in the subframe $n+k_{PHICH}$ according to the value of $I_{PHICH}$; and receives the PHICH corresponding to the PUSCH in the subframe $n+k_{PHICH}$ according to the determined PHICH resource.

Where $I_{PHICH}$ is the parameter for determining the PHICH resource.

In an implementation, the network-side device and the UE determine $I_{PHICH}=0$ corresponding to the PUSCH transmitted in the special subframe n, and determines the PHICH resource, corresponding to the PUSCH, in the subframe $n+k_{PHICH}$ according to the value of $I_{PHICH}$ as follows.

The network-side device and the UE firstly determine a resource index $(n_{PHICH}^{group}, n_{PHICH}^{seq})$ for identifying the PHICH among the $m_i * N_{PHICH}^{group}$ groups of PHICH resources in the subframe $n+k_{PHICH}$; and then locate the PHICH resource corresponding to the PUSCH among the $m_i * N_{PHICH}^{group}$ groups of PHICH resources in the subframe $n+k_{PHICH}$ according to the resource index; and finally the network-side device transmits ACK/NACK feedback information of the PUSCH on the PHICH resource, and the UE receives the ACK/NACK feedback information of the PUSCH on the PHICH resource.

Where the resource index $(n_{PHICH}^{group}, n_{PHICH}^{seq})$ for identifying the PHICH among the $m_i * N_{PHICH}^{group}$ groups of PHICH resources in the subframe $n+k_{PHICH}$ can be determined in the equations of:

$$N_{PHICH}^{group} = (I_{PRB\_RA} + n_{DMRS}) \bmod N_{PHICH}^{group} + I_{PHICH} N_{PHICH}^{group}$$

$$N_{PHICH}^{seq} = (\lfloor I_{PRB\_RA} / N_{PHICH}^{group} \rfloor + n_{DMRS}) \bmod 2N_{SF}^{PHICH}.$$

Where $n_{PHICH}^{group}$ is a PHICH group number, and can range from 0 to $m_i \cdot N_{PHICH}^{group} - 1$; $n_{PHICH}^{seq}$ is an orthogonal sequence number in the PHICH group, and a plurality of PHICHs in each PHICH group are mapped onto the same transmission resource, and distinguished from each other using orthogonal sequences; $n_{DMRS}$ is a value obtained according to Demodulation Reference Symbol (DMRS) cyclic shift information indicated in scheduling information of the corresponding PUSCH, as depicted in Table 3; $N_{SF}^{PHICH}$ is the length of the orthogonal sequence; $N_{PHICH}^{group}$ is the number of PHICH groups in each subframe determined as configured in higher-layer signaling; $I_{PRB\_RA}$ is a value determined according to the lowest Physical Resource Block (PRB) index of the PUSCH corresponding to the PHICH; and $I_{PHICH}$ is a value related to a TDD uplink-downlink configuration and/or a subframe prescribed in a standard, and for example, for the TDD uplink-downlink configuration 0 or the uplink reference TDD uplink-downlink configuration 0, when n=4 or 9, then $I_{PHICH}$=1; otherwise, $I_{PHICH}$=0; and when feedback information of PUSCHs in two subframes is transmitted on PHICH in the same corresponding subframe, a correspondence relationship between PHICH resource in the subframe and PUSCH is distinguished using this value.

TABLE 3

| Cyclic Shift for DMRS Field in PDCCH/EPDCCH with uplink DCI format | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

In the scheme above, a PHICH resource in an UpPTS equivalently lies in a legacy subframe including no PHICH resource; and in this manner, when a legacy UE does not know that the PHICH resource is reserved for the UpPTS in the subframe, then the legacy UE determines that no PHICH resource is reserved, that is, it determines $m_i$=0 in the subframe as defined in the prior art, and detect the PHICH resource as a PDCCH resource, thus hindering a legacy Physical Downlink Control Channel (PDCCH) from being detected. In the embodiment of the invention, the legacy UE can be notified via a broadcast or Radio Resource Control (RRC) signaling or downlink control signaling or the like that there are $N_{PHICH}^{group}$ groups of PHICH resources in the subframe $n+k_{PHICH}$ defined for the special subframe n, that is, $m_i$=1.

In a second scheme, for the TDD uplink-downlink configuration 0, when $k_{PHICH}$ is 4, 5, 9, or 10, or for the TDD uplink-downlink configuration 1, when $k_{PHICH}$ is 3, 5, 8, or 10, or for the TDD uplink-downlink configuration 2, when $k_{PHICH}$ is 2 or 7, or for the TDD uplink-downlink configuration 3, when $k_{PHICH}$ is 7, 8, or 9, or for the TDD uplink-downlink configuration 4, when $k_{PHICH}$ is 7 or 8, or for the TDD uplink-downlink configuration 5, when $k_{PHICH}$ is 7, or for the TDD uplink-downlink configuration 6, when $k_{PHICH}$ is 3, 4, 5, 8, 9, or 10, then the subframe $n+k_{PHICH}$ includes $m_i*N_{PHICH}^{group}$ groups of PHICHs, where $m_i$ is a value defined in the 3GPP TS 36.211, i.e., a value as depicted in Table 4 below.

TABLE 4

| Uplink-downlink configuration | Subframe index i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | 0 | 0 | 0 | 2 | 1 | 0 | 0 | 0 |
| 1 | 0 | 1 | 0 | 0 | 1 | 0 | 1 | 0 | 0 | 1 |
| 2 | 0 | 0 | 0 | 1 | 0 | 0 | 0 | 0 | 1 | 0 |
| 3 | 1 | 0 | 0 | 0 | 0 | 0 | 0 | 0 | 1 | 1 |
| 4 | 0 | 0 | 0 | 0 | 0 | 0 | 0 | 0 | 1 | 1 |
| 5 | 0 | 0 | 0 | 0 | 0 | 0 | 0 | 0 | 1 | 0 |
| 6 | 1 | 1 | 0 | 0 | 0 | 1 | 1 | 0 | 0 | 1 |

Where i is the subframe index of the subframe $n+k_{PHICH}$, $m_i$ is a coefficient for determining the number of PHICH groups corresponding to a subframe i in a TDD system, and $N_{PHICH}^{group}$ is the number of PHICH groups determined according to a parameter configured in high-layer signaling.

Correspondingly the network-side device determines the PHICH resource, corresponding to the PUSCH transmitted in the special subframe n, in the subframe $n+k_{PHICH}$ according to the lowest PRB index of the PUSCH transmitted in the special subframe n, DMRS cyclic shift information indicated in scheduling information of the PUSCH, and a prescribed or preconfigured $I_{PHICH}$ value corresponding to the PUSCH transmitted in the special subframe n; and transmits the PHICH corresponding to the PUSCH in the subframe $n+k_{PHICH}$ according to the determined PHICH resource, where the lowest PRB index of the PUSCH transmitted in the special subframe n is different from the lowest PRB index of a PUSCH transmitted in a corresponding uplink subframe for which the PHICH is transmitted according to the $I_{PHICH}$ value in the subframe $n+k_{PHICH}$, and/or the DMRS cyclic shift information indicated in the scheduling information of the PUSCH transmitted in the special subframe n is different from DMRS cyclic shift information indicated in scheduling information of a PUSCH transmitted in a corresponding uplink subframe for which the PHICH is transmitted according to the $I_{PHICH}$ value in the subframe $n+k_{PHICH}$.

The UE determines the PHICH resource, corresponding to the PUSCH transmitted in the special subframe n, in the subframe $n+k_{PHICH}$ according to the lowest PRB index of the PUSCH transmitted in the special subframe n, the DMRS cyclic shift information indicated in the scheduling information of the PUSCH, and the prescribed or preconfigured $I_{PHICH}$ value corresponding to the PUSCH transmitted in the special subframe n; and receives the PHICH corresponding to the PUSCH in the subframe $n+k_{PHICH}$ according to the determined PHICH resource, where the lowest PRB index of the PUSCH transmitted in the special subframe n is different from the lowest PRB index of a PUSCH transmitted in a corresponding uplink subframe for which the PHICH is received according to the $I_{PHICH}$ value in the subframe $n+k_{PHICH}$, and/or the DMRS cyclic shift information indicated in the scheduling information of the PUSCH transmitted in the special subframe n is different from DMRS cyclic shift information indicated in scheduling information of a PUSCH transmitted in a corresponding uplink subframe for which the PHICH is received according to the $I_{PHICH}$ value in the subframe $n+k_{PHICH}$.

In an implementation, the network-side device and the UE determine the PHICH resource, corresponding to the PUSCH transmitted in the special subframe n, in the subframe $n+k_{PHICH}$ according to the lowest PRB index of the PUSCH transmitted in the special subframe n, the DMRS cyclic shift information indicated in the scheduling information of the PUSCH, and the prescribed or preconfigured $I_{PHICH}$ value corresponding to the PUSCH transmitted in the special subframe n as follows.

The network-side device and the UE firstly determine a resource index ($n_{PHICH}^{group}$, $n_{PHICH}^{seq}$) for identifying the PHICH among the $m_i*N_{PHICH}^{group}$ groups of PHICH resources in the subframe $n+k_{PHICH}$; and then locate the PHICH resource corresponding to the PUSCH among the $m_i*N_{PHICH}^{group}$ groups of PHICH resources in the subframe $n+k_{PHICH}$ according to the resource index; and finally the network-side device transmits ACK/NACK feedback information of the PUSCH on the PHICH resource, and the UE receives the ACK/NACK feedback information of the PUSCH on the PHICH resource.

Where the resource index ($n_{PHICH}^{group}$, $n_{PHICH}^{seq}$) for identifying the PHICH among the $m_i*N_{PHICH}^{group}$ groups of PHICH resources in the subframe $n+k_{PHICH}$ can be determined in the equations of:

$$N_{PHICH}^{group} = (I_{PRB\_RA} + n_{DMRS}) \bmod N_{PHICH}^{group} + I_{PHICH} N_{PHICH}^{group}$$

$$N_{PHICH}^{seq} = (\lfloor I_{PRB\_RA} / N_{PHICH}^{group} \rfloor + n_{DMRS}) \bmod 2N_{SF}^{PHICH}.$$

Where $n_{PHICH}^{group}$ is a PHICH group number, and can range from 0 to $m_i \cdot N_{PHICH}^{group} - 1$; $n_{PHICH}^{seq}$ is an orthogonal sequence number in the PHICH group, and a plurality of PHICHs in each PHICH group are mapped onto the same transmission resource, and distinguished from each other using orthogonal sequences; $n_{DMRS}$ is a value obtained according to the DMRS cyclic shift information indicated in the scheduling information of the corresponding PUSCH as depicted in Table 3; $N_{SF}^{PHICH}$ is the length of the orthogonal sequence; $N_{PHICH}^{group}$ is the number of PHICH groups in each subframe determined as configured in higher-layer signaling; $I_{PRB\_RA}$ is a value determined according to the lowest PRB index of the PUSCH corresponding to the PHICH; and $I_{PHICH}$ is a value related to a TDD uplink-downlink configuration and/or a subframe prescribed in a standard, and for example, for the TDD uplink-downlink configuration 0 or the uplink reference TDD uplink-downlink configuration 0, when n=4 or 9, then $I_{PHICH}=1$; otherwise, $I_{PHICH}=0$; and when feedback information of PUSCHs in two subframes is transmitted on PHICHs in the same corresponding subframe, a correspondence relationship between a PHICH resource in the subframe and a PUSCH is distinguished using this value.

Here when $m_i=1$ in the subframe $n+k_{PHICH}$, then the $I_{PHICH}$ value corresponding to the PUSCH transmitted in the special subframe n is prescribed to be $I_{PHICH}=0$; and when $m_i=2$ in the subframe $n+k_{PHICH}$, then the $I_{PHICH}$ value corresponding to the PUSCH transmitted in the special subframe n is prescribed to be $I_{PHICH}=0$ or $I_{PHICH}=1$.

In a third scheme, for the TDD uplink-downlink configuration 0, when the subframe $n+k_{PHICH}$ is the subframe 1 or 6, or for the TDD uplink-downlink configuration 1, when the subframe $n+k_{PHICH}$ is the subframe 1, 4, 6, or 9, or for the TDD uplink-downlink configuration 2, when the subframe $n+k_{PHICH}$ is the subframe 3 or 8, or for the TDD uplink-downlink configuration 3, when the subframe $n+k_{PHICH}$ is the subframe 0, 8, or 9, or for the TDD uplink-downlink configuration 4, when the subframe $n+k_{PHICH}$ is the subframe 8 or 9, or for the TDD uplink-downlink configuration 5, when the subframe $n+k_{PHICH}$ is the subframe 8, or for the TDD uplink-downlink configuration 6, when the subframe $n+k_{PHICH}$ is the subframe 0, 1, 5, 6, or 9, then the subframe $n+k_{PHICH}$ includes $m_i * N_{PHICH}^{group}$ groups of PHICHs, where $m_i$ is 2.

Where i is the subframe index of the subframe $n+k_{PHICH}$, and $N_{PHICH}^{group}$ is the number of PHICH groups determined according to a parameter configured in high-layer signaling.

Correspondingly the network-side device determines $I_{PHICH}$ corresponding to the PUSCH transmitted in the special subframe n to be $I_{PHICH}=1$, and determines a PHICH resource, corresponding to the PUSCH, in the subframe $n+k_{PHICH}$ according to the $I_{PHICH}$ value; and transmits the PHICH corresponding to the PUSCH in the subframe $n+k_{PHICH}$ according to the determined PHICH resource.

The UE determines $I_{PHICH}$ corresponding to the PUSCH transmitted in the special subframe n to be $I_{PHICH}=1$, and determines the PHICH resource, corresponding to the PUSCH, in the subframe $n+k_{PHICH}$ according to the $I_{PHICH}$ value; and receives the PHICH corresponding to the PUSCH in the subframe $n+k_{PHICH}$ according to the determined PHICH resource.

Where $I_{PHICH}$ is the parameter for determining the PHICH resource.

With $m_i=2$, it is defined that the PUSCH transmitted in an UpPTS or a special subframe (i.e., the subframe n=1 or 6 in the configurations 0, 1, 2, and 6, and the subframe n=1 in the configurations 3, 4, and 5) corresponds to a PHICH resource with $I_{PHICH}=1$; in the configurations 1 to 6 or the configuration 0, a PUSCH transmitted in another subframe than the subframes 4 and 9, and a PUSCH transmitted in a normal subframe correspond to a PHICH resource with $I_{PHICH}=0$; and in the configuration 0, a PUSCH transmitted in a subframe 4 or 9 also corresponds to a PHICH resource with $I_{PHICH}=1$, but $k_{PHICH}$ corresponding to a special subframe is defined as above so that the subframe $n+k_{PHICH}$ corresponding to the special subframe is different from those of the subframes 4 and 9, that is, the PHICHs of PUSCHs in the subframes 4 and 9, and a PUSCH in an UpPTS may not be detected in the same subframe, so even if all the PUSCHs in the subframes 4 and 9, and the special subframe corresponds to $I_{PHICH}=1$, their respective PHICHs can be distinguished, that is, different subframes can be detected for their PHICHs.

In an implementation, the network-side device and the UE determine $I_{PHICH}$ corresponding to the PUSCH transmitted in the special subframe n to be $I_{PHICH}=1$, and determines the PHICH resource, corresponding to the PUSCH, in the subframe $n+k_{PHICH}$ according to the $I_{PHICH}$ value as follows.

The network-side device and the UE firstly determine a resource index $(n_{PHICH}^{group}, n_{PHICH}^{seq})$ for identifying the PHICH among the $m_i * N_{PHICH}^{group}$ groups of PHICH resources in the subframe $n+k_{PHICH}$; and then locate the PHICH resource corresponding to the PUSCH among the $m_i * N_{PHICH}^{group}$ groups of PHICH resources in the subframe $n+k_{PHICH}$ according to the resource index; and finally the network-side device transmits ACK/NACK feedback information of the PUSCH on the PHICH resource, and the UE receives the ACK/NACK feedback information of the PUSCH on the PHICH resource.

The resource index $(n_{PHICH}^{group}, n_{PHICH}^{seq})$ for identifying the PHICH among the $m_i * N_{PHICH}^{groups}$ of PHICH resources in the subframe $n+k_{PHICH}$ can be determined in the equations of:

$$N_{PHICH}^{group} = (I_{PRB\_RA} + n_{DMRS}) \bmod N_{PHICH}^{group} + I_{PHICH} N_{PHICH}^{group}$$

$$N_{PHICH}^{seq} = (\lfloor I_{PRB\_RA} / N_{PHICH}^{group} \rfloor + n_{DMRS}) \bmod 2N_{SF}^{PHICH}.$$

Where $n_{PHICH}^{group}$ is a PHICH group number; $n_{PHICH}^{seq}$ is an orthogonal sequence number in the PHICH group; $n_{DMRS}$ is a value obtained according to DMRS cyclic shift information indicated in scheduling information of the corresponding PUSCH as depicted in Table 3; $N_{SF}^{PHICH}$ is the length of the orthogonal sequence; $N_{PHICH}^{group}$ is the number of PHICH groups in each subframe determined as configured in higher-layer signaling; $I_{PRB\_RA}$ is a value determined according to the lowest PRB index of the PUSCH corresponding to the PHICH; and $I_{PHICH}$ is a value related to a TDD uplink-downlink configuration and/or a subframe prescribed in a standard, and for example, for the TDD uplink-downlink configuration 0 or the uplink reference TDD uplink-downlink configuration 0, when n=4 or 9, then $I_{PHICH}=1$; for a special subframe in the TDD uplink-downlink configurations 0 to 6, $I_{PHICH}=1$; otherwise, $I_{PHICH}=0$; and when feedback information of PUSCHs in two subframes is transmitted over PHICHs in the same corresponding subframe, a correspondence relationship between a PHICH resource in the subframe, and a PUSCH is distinguished using this value.

In a fourth scheme, for the TDD uplink-downlink configuration 0, when the subframe n+$k_{PHICH}$ is the subframe 0 or 5, then the subframe n+$k_{PHICH}$ includes $m_i * N_{PHICH}^{group}$ groups of PHICHs, where $m_i$ is 3.

Where i is the subframe index of the subframe n+$k_{PHICH}$, and $N_{PHICH}^{group}$ is the number of PHICH groups determined according to a parameter configured in high-layer signaling.

Correspondingly the UE determines $I_{PHICH}$ corresponding to the PUSCH transmitted in the special subframe n to be $I_{PHICH}$=2, and determines a PHICH resource, corresponding to the PUSCH, in the subframe n+$k_{PHICH}$ according to the $I_{PHICH}$ value; and receives the PHICH corresponding to the PUSCH in the subframe n+$k_{PHICH}$ according to the determined PHICH resource.

The network-side device determines $I_{PHICH}$ corresponding to the PUSCH transmitted in the special subframe n to be $I_{PHICH}$=2, and determines the PHICH resource, corresponding to the PUSCH, in the subframe n+$k_{PHICH}$ according to the $I_{PHICH}$ value; and transmits the PHICH corresponding to the PUSCH in the subframe n+$k_{PHICH}$ according to the determined PHICH resource.

Where $I_{PHICH}$ is the parameter for determining the PHICH resource.

With $m_i$=3, it is defined for the TDD uplink-downlink configuration 0 that a PUSCH transmitted in an UpPTS or the special subframe n=1 or 6 corresponds to a PHICH resource with $I_{PHICH}$=2, a PUSCH transmitted in the subframe 4 or 9 corresponds to a PHICH resource with $I_{PHICH}$=1, and a PUSCH transmitted in another subframe corresponds to a PHICH resource with $I_{PHICH}$=0.

In an implementation, the network-side device and the UE determine $I_{PHICH}$ corresponding to the PUSCH transmitted in the special subframe n to be $I_{PHICH}$=2, and determines the PHICH resource, corresponding to the PUSCH, in the subframe n+$k_{PHICH}$ according to the $I_{PHICH}$ value as follows.

The network-side device and the UE firstly determine a resource index ($n_{PHICH}^{group}, n_{PHICH}^{seq}$) for identifying the PHICH among the $m_i * N_{PHICH}^{group}$ groups of PHICH resources in the subframe n+$k_{PHICH}$; and then locate the PHICH resource corresponding to the PUSCH among the $m_i * N_{PHICH}^{group}$ groups of PHICH resources in the subframe n+$k_{PHICH}$ according to the resource index; and finally the network-side device transmits ACK/NACK feedback information of the PUSCH on the PHICH resource, and the UE receives the ACK/NACK feedback information of the PUSCH on the PHICH resource.

The resource index ($n_{PHICH}^{group}, n_{PHICH}^{seq}$) for identifying the PHICH among the $m_i * N_{PHICH}^{group}$ groups of PHICH resources in the subframe n+$k_{PHICH}$ can be determined in the equations of:

$$N_{PHICH}^{group} = (I_{PRB\_RA} + n_{DMRS}) \bmod N_{PHICH}^{group} + I_{PHICH} N_{PHICH}^{group}$$

$$N_{PHICH}^{seq} = (\lfloor I_{PRB\_RA} / N_{PHICH}^{group} \rfloor + n_{DMRS}) \bmod 2N_{SF}^{PHICH}.$$

Where $n_{PHICH}^{group}$ is a PHICH group number; $n_{PHICH}^{seq}$ is an orthogonal sequence number in the PHICH group; $n_{DMRS}$ is a value obtained according to DMRS cyclic shift information indicated in scheduling information of the corresponding PUSCH as depicted in Table 3; $N_{SF}^{PHICH}$ is the length of the orthogonal sequence; $N_{PHICH}^{group}$ is the number of PHICH groups in each subframe determined as configured in higher-layer signaling; $I_{PRB\_RA}$ is a value determined according to the lowest PRB index of the PUSCH corresponding to the PHICH; and $I_{PHICH}$ is a value related to a TDD uplink-downlink configuration and/or a subframe prescribed in a standard, and for example, for the TDD uplink-downlink configuration 0 or the uplink reference TDD uplink-downlink configuration 0, when n=1 or 4 or 6 or 9, then $I_{PHICH}$=1; otherwise, $I_{PHICH}$=0; and when feedback information of PUSCHs in two subframes is transmitted on PHICHs in the same corresponding subframe, a correspondence relationship between a PHICH resource in the subframe, and a PUSCH is distinguished using this value.

Figure 3:
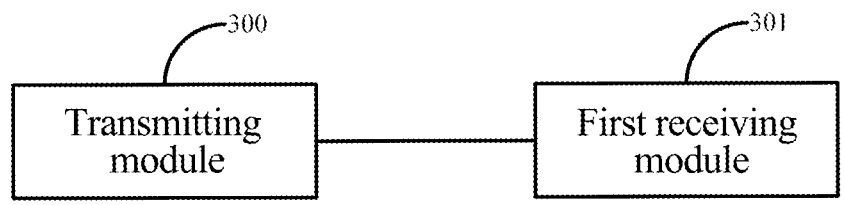
FIG. 3 is a schematic structural diagram of a first UE according to an embodiment of the invention.

As illustrated in FIG. 3, a first UE according to an embodiment of the invention includes the following modules.

A transmitting module 300 is configured to transmit a PUSCH in a special subframe n.

A first receiving module 301 is configured to receive a PHICH corresponding to the PUSCH in a subframe n+$k_{PHICH}$, where the PHICH carries feedback information of the PUSCH, and $k_{PHICH}$ is a prescribed or preconfigured value.

Optionally for the TDD uplink-downlink configuration 0, when n is 1 or 6, then $k_{PHICH}$ is one of 4, 5, 9, and 10; or For the TDD uplink-downlink configuration 1, when n is 1 or 6, then $k_{PHICH}$ is one of 3, 4, 5, 8, 9, and 10; or For the TDD uplink-downlink configuration 2, when n is 1 or 6, then $k_{PHICH}$ is one of 2, 3, 4, 5, 7, 8, 9, and 10; or For the TDD uplink-downlink configuration 3, when n is 1, then $k_{PHICH}$ is one of 4, 5, 6, 7, 8, 9, and 10; or For the TDD uplink-downlink configuration 4, when n is 1, then $k_{PHICH}$ is one of 3, 4, 5, 6, 7, 8, 9, and 10; or For the TDD uplink-downlink configuration 5, when n is 1, then $k_{PHICH}$ is one of 2, 3, 4, 5, 6, 7, 8, 9, and 10; or For the TDD uplink-downlink configuration 6, when n is 1, then $k_{PHICH}$ is one of 4, 5, 8, 9, and 10; or For the TDD uplink-downlink configuration 6, when n is 6, then $k_{PHICH}$ is one of 3, 4, 5, 9, and 10.

Where the TDD uplink-downlink configuration is an uplink reference TDD uplink-downlink configuration, or a TDD uplink-downlink configuration configured in system information.

Optionally for the TDD uplink-downlink configuration 1, when the subframe n+$k_{PHICH}$ is the subframe 0 or 5, or for the TDD uplink-downlink configuration 2, when the subframe n+$k_{PHICH}$ is the subframe 0, 1, 4, 5, 6, or 9, or for the TDD uplink-downlink configuration 3, when the subframe n+$k_{PHICH}$ is the subframe 1, 5, 6, or 7, or for the TDD uplink-downlink configuration 4, when the subframe n+$k_{PHICH}$ is the subframe 0, 1, 4, 5, 6, or 7, or for the TDD uplink-downlink configuration 5, when the subframe n+$k_{PHICH}$ is the subframe 0, 1, 3, 4, 5, 6, 7, or 9, then the subframe n+$k_{PHICH}$ includes $m_i * N_{PHICH}^{group}$ groups of PHICHs, where $m_i$ is 1.

Where i is the subframe index of the subframe n+$k_{PHICH}$, and $N_{PHICH}^{group}$ is the number of PHICH groups determined according to a parameter configured in high-layer signaling.

Optionally the first receiving module 301 is configured:

To determine $I_{PHICH}$ corresponding to the PUSCH transmitted in the special subframe n to be $I_{PHICH}$=0, and to determine a PHICH resource, corresponding to the PUSCH, in the subframe n+$k_{PHICH}$ according to the value of $I_{PHICH}$; and To receive the PHICH corresponding to the PUSCH in the subframe n+$k_{PHICH}$ according to the determined PHICH resource.

Where $I_{PHICH}$ is the parameter for determining the PHICH resource.

Optionally for the TDD uplink-downlink configuration 0, when $k_{PHICH}$ is 4, 5, 9, or 10, or for the TDD uplink-downlink configuration 1, when $k_{PHICH}$ is 3, 5, 8, or 10, or for the TDD uplink-downlink configuration 2, when $k_{PHICH}$ is 2 or 7, or for the TDD uplink-downlink configuration 3, when $k_{PHICH}$ is 7, 8, or 9, or for the TDD uplink-downlink configuration 4, when $k_{PHICH}$ is 7 or 8, or for the TDD uplink-downlink configuration 5, when $k_{PHICH}$ is 7, or for the TDD uplink-downlink configuration 6, when $k_{PHICH}$ is 3, 4, 5, 8, 9, or 10, then the subframe $n+k_{PHICH}$ includes $m_i * N_{PHICH}^{group}$ groups of PHICHs, where $m_i$ is a value defined in the 3GPP TS 36.211.

Where i is the subframe index of the subframe $n+k_{PHICH}$, $m_i$ is a coefficient for determining the number of PHICH groups corresponding to a subframe i in a TDD system, and $N_{PHICH}^{group}$ is the number of PHICH groups determined according to a parameter configured in high-layer signaling.

Optionally the first receiving module 301 is configured:

To determine a PHICH resource, corresponding to the PUSCH transmitted in the special subframe n, in the subframe $n+k_{PHICH}$ according to the lowest PRB index of the PUSCH transmitted in the special subframe n, DMRS cyclic shift information indicated in scheduling information of the PUSCH, and a prescribed or preconfigured value of $I_{PHICH}$ corresponding to the PUSCH transmitted in the special subframe n; and To receive the PHICH corresponding to the PUSCH in the subframe $n+k_{PHICH}$ according to the determined PHICH resource.

Where the lowest PRB index of the PUSCH transmitted in the special subframe n is different from the lowest PRB index of a PUSCH transmitted in a corresponding uplink subframe for which the PHICH is received according to the value of $I_{PHICH}$ in the subframe $n+k_{PHICH}$, and/or the DMRS cyclic shift information indicated in the scheduling information of the PUSCH transmitted in the special subframe n is different from DMRS cyclic shift information indicated in scheduling information of a PUSCH transmitted in a corresponding uplink subframe for which the PHICH is received according to the value of $I_{PHICH}$ in the subframe $n+k_{PHICH}$.

Optionally for the TDD uplink-downlink configuration 0, when the subframe $n+k_{PHICH}$ is the subframe 1 or 6, or for the TDD uplink-downlink configuration 1, when the subframe $n+k_{PHICH}$ is the subframe 1, 4, 6, or 9, or for the TDD uplink-downlink configuration 2, when the subframe $n+k_{PHICH}$ is the subframe 3 or 8, or for the TDD uplink-downlink configuration 3, when the subframe $n+k_{PHICH}$ is the subframe 0, 8, or 9, or for the TDD uplink-downlink configuration 4, when the subframe $n+k_{PHICH}$ is the subframe 8 or 9, or for the TDD uplink-downlink configuration 5, when the subframe $n+k_{PHICH}$ is the subframe 8, or for the TDD uplink-downlink configuration 6, when the subframe $n+k_{PHICH}$ is the subframe 0, 1, 5, 6, or 9, then the subframe $n+k_{PHICH}$ includes $m_i * N_{PHICH}^{group}$ groups of PHICHs, where $m_i$ is 2.

Where i is the subframe index of the subframe $n+k_{PHICH}$, and $N_{PHICH}^{group}$ is the number of PHICH groups determined according to a parameter configured in high-layer signaling.

Optionally the first receiving module 301 is configured:

To determine $I_{PHICH}$ corresponding to the PUSCH transmitted in the special subframe n to be $I_{PHICH}=1$, and to determine a PHICH resource, corresponding to the PUSCH, in the subframe $n+k_{PHICH}$ according to the value of $I_{PHICH}$; and To receive the PHICH corresponding to the PUSCH in the subframe $n+k_{PHICH}$ according to the determined PHICH resource.

Where $I_{PHICH}$ is the parameter for determining the PHICH resource.

Optionally for the TDD uplink-downlink configuration 0, when the subframe $n+k_{PHICH}$ is the subframe 0 or 5, then the subframe $n+k_{PHICH}$ includes $m_i * N_{PHICH}^{group}$ groups of PHICHs, where $m_i$ is 3.

Where i is the subframe index of the subframe $n+k_{PHICH}$, and $N_{PHICH}^{group}$ is the number of PHICH groups determined according to a parameter configured in high-layer signaling.

Optionally the first receiving module 301 is configured:

To determine $I_{PHICH}$ corresponding to the PUSCH transmitted in the special subframe n to be $I_{PHICH}=2$, and to determine a PHICH resource, corresponding to the PUSCH, in the subframe $n+k_{PHICH}$ according to the value of $I_{PHICH}$; and To receive the PHICH corresponding to the PUSCH in the subframe $n+k_{PHICH}$ according to the determined PHICH resource.

Where $I_{PHICH}$ is the parameter for determining the PHICH resource.

Figure 4:
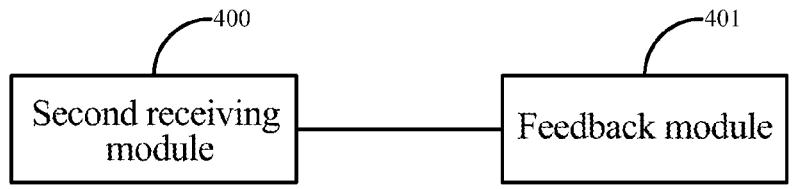
FIG. 4 is a schematic structural diagram of a first network-side device according to an embodiment of the invention.

As illustrated in FIG. 4, a first network-side device according to an embodiment of the invention includes the following modules.

A second receiving module 400 is configured to receive a PUSCH in a special subframe n.

A feedback module 401 is configured to transmit a PHICH corresponding to the PUSCH in a subframe $n+k_{PHICH}$, where the PHICH carries feedback information of the PUSCH, and $k_{PHICH}$ is a prescribed or preconfigured value.

Optionally for the TDD uplink-downlink configuration 0, when n is 1 or 6, then $k_{PHICH}$ is one of 4, 5, 9, and 10; or For the TDD uplink-downlink configuration 1, when n is 1 or 6, then $k_{PHICH}$ is one of 3, 4, 5, 8, 9, and 10; or For the TDD uplink-downlink configuration 2, when n is 1 or 6, then $k_{PHICH}$ is one of 2, 3, 4, 5, 7, 8, 9, and 10; or For the TDD uplink-downlink configuration 3, when n is 1, then $k_{PHICH}$ is one of 4, 5, 6, 7, 8, 9, and 10; or For the TDD uplink-downlink configuration 4, when n is 1, then $k_{PHICH}$ is one of 3, 4, 5, 6, 7, 8, 9, and 10; or For the TDD uplink-downlink configuration 5, when n is 1, then $k_{PHICH}$ is one of 2, 3, 4, 5, 6, 7, 8, 9, and 10; or For the TDD uplink-downlink configuration 6, when n is 1, then $k_{PHICH}$ is one of 4, 5, 8, 9, and 10; or For the TDD uplink-downlink configuration 6, when n is 6, then $k_{PHICH}$ is one of 3, 4, 5, 9, and 10.

Where the TDD uplink-downlink configuration is an uplink reference TDD uplink-downlink configuration, or a TDD uplink-downlink configuration configured in system information.

Optionally for the TDD uplink-downlink configuration 1, when the subframe $n+k_{PHICH}$ is the subframe 0 or 5, or for the TDD uplink-downlink configuration 2, when the subframe $n+k_{PHICH}$ is the subframe 0, 1, 4, 5, 6, or 9, or for the TDD uplink-downlink configuration 3, when the subframe $n+k_{PHICH}$ is the subframe 1, 5, 6, or 7, or for the TDD uplink-downlink configuration 4, when the subframe $n+k_{PHICH}$ is the subframe 0, 1, 4, 5, 6, or 7, or for the TDD uplink-downlink configuration 5, when the subframe $n+k_{PHICH}$ is the subframe 0, 1, 3, 4, 5, 6, 7, or 9, then the subframe $n+k_{PHICH}$ includes $m_i * N_{PHICH}^{group}$ groups of PHICHs, where $m_i$ is 1.

Where i is the subframe index of the subframe $n+k_{PHICH}$, and $N_{PHICH}^{group}$ is the number of PHICH groups determined according to a parameter configured in high-layer signaling.

Optionally the feedback module 401 is configured:

To determine $I_{PHICH}$ corresponding to the PUSCH transmitted in the special subframe n to be $I_{PHICH}=0$, and to determine a PHICH resource, corresponding to the PUSCH, in the subframe $n+k_{PHICH}$ according to the value of $I_{PHICH}$; and To transmit the PHICH corresponding to the PUSCH in the subframe $n+k_{PHICH}$ according to the determined PHICH resource.

Where $I_{PHICH}$ is the parameter for determining the PHICH resource.

Optionally for the TDD uplink-downlink configuration 0, when $k_{PHICH}$ is 4, 5, 9, or 10, or for the TDD uplink-downlink configuration 1, when $k_{PHICH}$ is 3, 5, 8, or 10, or for the TDD uplink-downlink configuration 2, when $k_{PHICH}$ is 2 or 7, or for the TDD uplink-downlink configuration 3, when $k_{PHICH}$ is 7, 8, or 9, or for the TDD uplink-downlink configuration 4, when $k_{PHICH}$ is 7 or 8, or for the TDD uplink-downlink configuration 5, when $k_{PHICH}$ is 7, or for the TDD uplink-downlink configuration 6, when $k_{PHICH}$ is 3, 4, 5, 8, 9, or 10, then the subframe $n+k_{PHICH}$ includes $m_i * N_{PHICH}^{group}$ groups of PHICHs, where $m_i$ is a value defined in the 3GPP TS 36.211.

Where i is the subframe index of the subframe $n+k_{PHICH}$, $m_i$ is a coefficient for determining the number of PHICH groups corresponding to a subframe i in a TDD system, and $N_{PHICH}^{group}$ is the number of PHICH groups determined according to a parameter configured in high-layer signaling.

Optionally the feedback module 401 is configured:

To determine a PHICH resource, corresponding to the PUSCH transmitted in the special subframe n, in the subframe $n+k_{PHICH}$ according to the lowest PRB index of the PUSCH transmitted in the special subframe n, DMRS cyclic shift information indicated in scheduling information of the PUSCH, and a prescribed or preconfigured value of $I_{PHICH}$ corresponding to the PUSCH transmitted in the special subframe n; and To transmit the PHICH corresponding to the PUSCH in the subframe $n+k_{PHICH}$ according to the determined PHICH resource.

Where the lowest PRB index of the PUSCH transmitted in the special subframe n is different from the lowest PRB index of a PUSCH transmitted in a corresponding uplink subframe for which the PHICH is transmitted according to the value of $I_{PHICH}$ in the subframe $n+k_{PHICH}$, and/or the DMRS cyclic shift information indicated in the scheduling information of the PUSCH transmitted in the special subframe n is different from DMRS cyclic shift information indicated in scheduling information of a PUSCH transmitted in a corresponding uplink subframe for which the PHICH is received according to the value of $I_{PHICH}$ in the subframe $n+k_{PHICH}$.

Optionally for the TDD uplink-downlink configuration 0, when the subframe $n+k_{PHICH}$ is the subframe 1 or 6, or for the TDD uplink-downlink configuration 1, when the subframe $n+k_{PHICH}$ is the subframe 1, 4, 6, or 9, or for the TDD uplink-downlink configuration 2, when the subframe $n+k_{PHICH}$ is the subframe 3 or 8, or for the TDD uplink-downlink configuration 3, when the subframe $n+k_{PHICH}$ is the subframe 0, 8, or 9, or for the TDD uplink-downlink configuration 4, when the subframe $n+k_{PHICH}$ is the subframe 8 or 9, or for the TDD uplink-downlink configuration 5, when the subframe $n+k_{PHICH}$ is the subframe 8, or for the TDD uplink-downlink configuration 6, when the subframe $n+k_{PHICH}$ is the subframe 0, 1, 5, 6, or 9, then the subframe $n+k_{PHICH}$ includes $m_i * N_{PHICH}^{group}$ groups of PHICHs, where $m_i$ is 2.

Where i is the subframe index of the subframe $n+k_{PHICH}$, and $N_{PHICH}^{group}$ is the number of PHICH groups determined according to a parameter configured in high-layer signaling.

Optionally the feedback module 401 is configured:

To determine $I_{PHICH}$ corresponding to the PUSCH transmitted in the special subframe n to be $I_{PHICH}=1$, and to determine a PHICH resource, corresponding to the PUSCH, in the subframe $n+k_{PHICH}$ according to the value of $I_{PHICH}$; and To transmit the PHICH corresponding to the PUSCH in the subframe $n+k_{PHICH}$ according to the determined PHICH resource.

Where $I_{PHICH}$ is the parameter for determining the PHICH resource.

Optionally for the TDD uplink-downlink configuration 0, when the subframe $n+k_{PHICH}$ is the subframe 0 or 5, then the subframe $n+k_{PHICH}$ includes $m_i * N_{PHICH}^{group}$ groups of PHICHs, where $m_i$ is 3.

Where i is the subframe index of the subframe $n+k_{PHICH}$, and $N_{PHICH}^{group}$ is the number of PHICH groups determined according to a parameter configured in high-layer signaling.

Optionally the feedback module 401 is configured: To determine $I_{PHICH}$ corresponding to the PUSCH transmitted in the special subframe n to be $I_{PHICH}=2$, and to determine a PHICH resource, corresponding to the PUSCH, in the subframe $n+k_{PHICH}$ according to the value of $I_{PHICH}$; and To transmit the PHICH corresponding to the PUSCH in the subframe $n+k_{PHICH}$ according to the determined PHICH resource.

Where $I_{PHICH}$ is the parameter for determining the PHICH resource.

Figure 5:
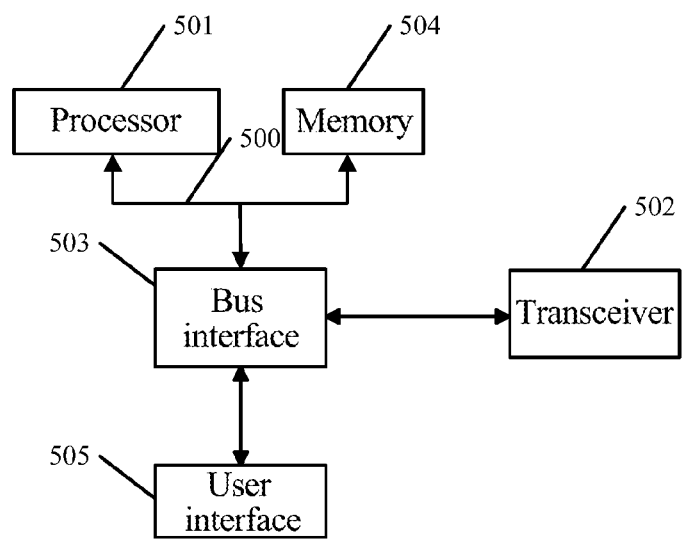
FIG. 5 is a schematic structural diagram of a second UE according to an embodiment of the invention.

As illustrated in FIG. 5, a second UE according to an embodiment of the invention includes the followings.

A processor 501 is configured to read and execute program in a memory 504:

To transmit a PUSCH in a special subframe n through a transceiver 502; and to receive a PHICH corresponding to the PUSCH in a subframe $n+k_{PHICH}$ through the transceiver 502, where the PHICH carries feedback information of the PUSCH, and $k_{PHICH}$ is a prescribed or preconfigured value.

The transceiver 502 is configured to receive and transmit data under the control of the processor 501.

Optionally for the TDD uplink-downlink configuration 0, when n is 1 or 6, then $k_{PHICH}$ is one of 4, 5, 9, and 10; or For the TDD uplink-downlink configuration 1, when n is 1 or 6, then $k_{PHICH}$ is one of 3, 4, 5, 8, 9, and 10; or For the TDD uplink-downlink configuration 2, when n is 1 or 6, then $k_{PHICH}$ is one of 2, 3, 4, 5, 7, 8, 9, and 10; or For the TDD uplink-downlink configuration 3, when n is 1, then $k_{PHICH}$ is one of 4, 5, 6, 7, 8, 9, and 10; or For the TDD uplink-downlink configuration 4, when n is 1, then $k_{PHICH}$ is one of 3, 4, 5, 6, 7, 8, 9, and 10; or For the TDD uplink-downlink configuration 5, when n is 1, then $k_{PHICH}$ is one of 2, 3, 4, 5, 6, 7, 8, 9, and 10; or For the TDD uplink-downlink configuration 6, when n is 1, then $k_{PHICH}$ is one of 4, 5, 8, 9, and 10; or For the TDD uplink-downlink configuration 6, when n is 6, then $k_{PHICH}$ is one of 3, 4, 5, 9, and 10.

Where the TDD uplink-downlink configuration is an uplink reference TDD uplink-downlink configuration, or a TDD uplink-downlink configuration configured in system information.

Optionally for the TDD uplink-downlink configuration 1, when the subframe $n+k_{PHICH}$ is the subframe 0 or 5, or for the TDD uplink-downlink configuration 2, when the subframe $n+k_{PHICH}$ is the subframe 0, 1, 4, 5, 6, or 9, or for the TDD uplink-downlink configuration 3, when the subframe $n+k_{PHICH}$ is the subframe 1, 5, 6, or 7, or for the TDD uplink-downlink configuration 4, when the subframe $n+k_{PHICH}$ is the subframe 0, 1, 4, 5, 6, or 7, or for the TDD uplink-downlink configuration 5, when the subframe $n+k_{PHICH}$ is the subframe 0, 1, 3, 4, 5, 6, 7, or 9, then the subframe $n+k_{PHICH}$ includes $m_i*N_{PHICH}^{group}$ groups of PHICHs, where $m_i$ is 1.

Where i is the subframe index of the subframe $n+k_{PHICH}$, and $N_{PHICH}^{group}$ is the number of PHICH groups determined according to a parameter configured in high-layer signaling.

Optionally the processor 501 is configured:

To determine $I_{PHICH}$ corresponding to the PUSCH transmitted in the special subframe n to be $I_{PHICH}=0$, and to determine a PHICH resource, corresponding to the PUSCH, in the subframe $n+k_{PHICH}$ according to the value of $I_{PHICH}$; and To receive the PHICH corresponding to the PUSCH in the subframe $n+k_{PHICH}$ according to the determined PHICH resource.

Where $I_{PHICH}$ is the parameter for determining the PHICH resource.

Optionally for the TDD uplink-downlink configuration 0, when $k_{PHICH}$ is 4, 5, 9, or 10, or for the TDD uplink-downlink configuration 1, when $k_{PHICH}$ is 3, 5, 8, or 10, or for the TDD uplink-downlink configuration 2, when $k_{PHICH}$ is 2 or 7, or for the TDD uplink-downlink configuration 3, when $k_{PHICH}$ is 7, 8, or 9, or for the TDD uplink-downlink configuration 4, when $k_{PHICH}$ is 7 or 8, or for the TDD uplink-downlink configuration 5, when $k_{PHICH}$ is 7, or for the TDD uplink-downlink configuration 6, when $k_{PHICH}$ is 3, 4, 5, 8, 9, or 10, then the subframe $n+k_{PHICH}$ includes $m_i*N_{PHICH}^{group}$ groups of PHICHs, where $m_i$ is a value defined in the 3GPP TS 36.211.

Where i is the subframe index of the subframe $n+k_{PHICH}$, $m_i$ is a coefficient for determining the number of PHICH groups corresponding to a subframe i in a TDD system, and $N_{PHICH}^{group}$ is the number of PHICH groups determined according to a parameter configured in high-layer signaling.

Optionally the processor 501 is configured:

To determine a PHICH resource, corresponding to the PUSCH transmitted in the special subframe n, in the subframe $n+k_{PHICH}$ according to the lowest PRB index of the PUSCH transmitted in the special subframe n, DMRS cyclic shift information indicated in scheduling information of the PUSCH, and a prescribed or preconfigured value of $I_{PHICH}$ corresponding to the PUSCH transmitted in the special subframe n; and To receive the PHICH corresponding to the PUSCH in the subframe $n+k_{PHICH}$ according to the determined PHICH resource.

Where the lowest PRB index of the PUSCH transmitted in the special subframe n is different from the lowest PRB index of a PUSCH transmitted in a corresponding uplink subframe for which the PHICH is received according to the value of $I_{PHICH}$ in the subframe $n+k_{PHICH}$, and/or the DMRS cyclic shift information indicated in the scheduling information of the PUSCH transmitted in the special subframe n is different from DMRS cyclic shift information indicated in scheduling information of a PUSCH transmitted in a corresponding uplink subframe for which the PHICH is received according to the value of $I_{PHICH}$ in the subframe $n+k_{PHICH}$.

Optionally for the TDD uplink-downlink configuration 0, when the subframe $n+k_{PHICH}$ is the subframe 1 or 6, or for the TDD uplink-downlink configuration 1, when the subframe $n+k_{PHICH}$ is the subframe 1, 4, 6, or 9, or for the TDD uplink-downlink configuration 2, when the subframe $n+k_{PHICH}$ is the subframe 3 or 8, or for the TDD uplink-downlink configuration 3, when the subframe $n+k_{PHICH}$ is the subframe 0, 8, or 9, or for the TDD uplink-downlink configuration 4, when the subframe $n+k_{PHICH}$ is the subframe 8 or 9, or for the TDD uplink-downlink configuration 5, when the subframe $n+k_{PHICH}$ is the subframe 8, or for the TDD uplink-downlink configuration 6, when the subframe $n+k_{PHICH}$ is the subframe 0, 1, 5, 6, or 9, then the subframe $n+k_{PHICH}$ includes $m_i*N_{PHICH}^{group}$ groups of PHICHs, where $m_i$ is 2.

Where i is the subframe index of the subframe $n+k_{PHICH}$, and $N_{PHICH}^{group}$ is the number of PHICH groups determined according to a parameter configured in high-layer signaling.

Optionally the processor 501 is configured:

To determine $I_{PHICH}$ corresponding to the PUSCH transmitted in the special subframe n to be $I_{PHICH}=1$, and to determine a PHICH resource, corresponding to the PUSCH, in the subframe $n+k_{PHICH}$ according to the value of $I_{PHICH}$; and To receive the PHICH corresponding to the PUSCH in the subframe $n+k_{PHICH}$ according to the determined PHICH resource.

Where $I_{PHICH}$ is the parameter for determining the PHICH resource.

Optionally for the TDD uplink-downlink configuration 0, when the subframe $n+k_{PHICH}$ is the subframe 0 or 5, then the subframe $n+k_{PHICH}$ includes $m_i*N_{PHICH}^{group}$ groups of PHICHs, where $m_i$ is 3.

Where i is the subframe index of the subframe $n+k_{PHICH}$, and $N_{PHICH}^{group}$ is the number of PHICH groups determined according to a parameter configured in high-layer signaling.

Optionally the processor 501 is configured:

To determine $I_{PHICH}$ corresponding to the PUSCH transmitted in the special subframe n to be $I_{PHICH}=2$, and to determine a PHICH resource, corresponding to the PUSCH, in the subframe $n+k_{PHICH}$ according to the value of $I_{PHICH}$; and To receive the PHICH corresponding to the PUSCH in the subframe $n+k_{PHICH}$ according to the determined PHICH resource.

Where $I_{PHICH}$ is the parameter for determining the PHICH resource.

Here in FIG. 5, in the bus architecture (represented as the bus 500), the bus 500 can include any number of interconnecting buses and bridges to particularly link together various circuits including one or more processors represented by the processor 501, and one or more memories represented by the memory 504. The bus 500 can further link together various other circuits, e.g., a peripheral device, a manostat, a power management circuit, etc., all of which are well known in the art, so a further description thereof will be omitted in this context. The bus interface 503 serves as an interface between the bus 500 and the transceiver 502. The transceiver 502 can be an element, or a number of elements, e.g., a number of transmitters and receivers, which are units for communication with various other devices over a transmission medium. For example, the transceiver 502 receives external data from another device. The transceiver 502 is configured to transmit data processed by the processor 501 to the other device. The user interface 505 can be further provided, e.g., a keypad, a display, a loudspeaker, a microphone, a joystick, etc., dependent upon the nature of a computing system.

The processor 501 is responsible for managing the bus 500 and performing normal processes, and the memory 504 can store data for use by the processor 501 in performing the operations.

The processor 501 can be a Central Processing Unit (CPU), an Application-Specific Integrated Circuit (ASIC), a Field-Programmable Gate Array (FPGA), or a Complex Programmable Logic Device (CPLD).

Figure 6:
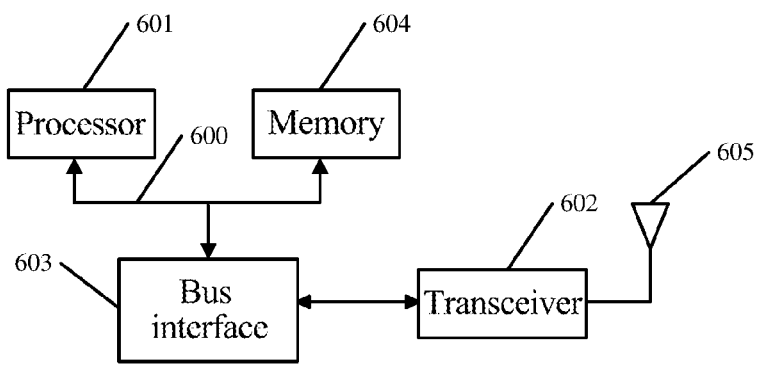
FIG. 6 is a schematic structural diagram of a second network-side device according to an embodiment of the invention.

As illustrated in FIG. 6, a second network-side device according to an embodiment of the invention includes the followings.

A processor 601 is configured to read and execute program in a memory 604:

To receive a PUSCH in a special subframe n through a transceiver 602; and to transmit a PHICH corresponding to the PUSCH in a subframe $n+k_{PHICH}$ through the transceiver 602, where the PHICH carries feedback information of the PUSCH, and $k_{PHICH}$ is a prescribed or preconfigured value.

The transceiver 602 is configured to receive and transmit data under the control of the processor 601.

Optionally for the TDD uplink-downlink configuration 0, when n is 1 or 6, then $k_{PHICH}$ is one of 4, 5, 9, and 10; or For the TDD uplink-downlink configuration 1, when n is 1 or 6, then $k_{PHICH}$ is one of 3, 4, 5, 8, 9, and 10; or For the TDD uplink-downlink configuration 2, when n is 1 or 6, then $k_{PHICH}$ is one of 2, 3, 4, 5, 7, 8, 9, and 10; or For the TDD uplink-downlink configuration 3, when n is 1, then $k_{PHICH}$ is one of 4, 5, 6, 7, 8, 9, and 10; or For the TDD uplink-downlink configuration 4, when n is 1, then $k_{PHICH}$ is one of 3, 4, 5, 6, 7, 8, 9, and 10; or For the TDD uplink-downlink configuration 5, when n is 1, then $k_{PHICH}$ is one of 2, 3, 4, 5, 6, 7, 8, 9, and 10; or For the TDD uplink-downlink configuration 6, when n is 1, then $k_{PHICH}$ is one of 4, 5, 8, 9, and 10; or For the TDD uplink-downlink configuration 6, when n is 6, then $k_{PHICH}$ is one of 3, 4, 5, 9, and 10.

Where the TDD uplink-downlink configuration is an uplink reference TDD uplink-downlink configuration, or a TDD uplink-downlink configuration configured in system information.

Optionally for the TDD uplink-downlink configuration 1, when the subframe $n+k_{PHICH}$ is the subframe 0 or 5, or for the TDD uplink-downlink configuration 2, when the subframe $n+k_{PHICH}$ is the subframe 0, 1, 4, 5, 6, or 9, or for the TDD uplink-downlink configuration 3, when the subframe $n+k_{PHICH}$ is the subframe 1, 5, 6, or 7, or for the TDD uplink-downlink configuration 4, when the subframe $n+k_{PHICH}$ is the subframe 0, 1, 4, 5, 6, or 7, or for the TDD uplink-downlink configuration 5, when the subframe $n+k_{PHICH}$ is the subframe 0, 1, 3, 4, 5, 6, 7, or 9, then the subframe $n+k_{PHICH}$ includes $m_i * N_{PHICH}^{group}$ groups of PHICHs, where $m_i$ is 1.

Where i is the subframe index of the subframe $n+k_{PHICH}$, and $N_{PHICH}^{group}$ is the number of PHICH groups determined according to a parameter configured in high-layer signaling.

Optionally the processor 601 is configured:

To determine $I_{PHICH}$ corresponding to the PUSCH transmitted in the special subframe n to be $I_{PHICH}=0$, and to determine a PHICH resource, corresponding to the PUSCH, in the subframe $n+k_{PHICH}$ according to the value of $I_{PHICH}$; and To transmit the PHICH corresponding to the PUSCH in the subframe $n+k_{PHICH}$ according to the determined PHICH resource.

Where $I_{PHICH}$ is the parameter for determining the PHICH resource.

Optionally for the TDD uplink-downlink configuration 0, when $k_{PHICH}$ is 4, 5, 9, or 10, or for the TDD uplink-downlink configuration 1, when $k_{PHICH}$ is 3, 5, 8, or 10, or for the TDD uplink-downlink configuration 2, when $k_{PHICH}$ is 2 or 7, or for the TDD uplink-downlink configuration 3, when $k_{PHICH}$ is 7, 8, or 9, or for the TDD uplink-downlink configuration 4, when $k_{PHICH}$ is 7 or 8, or for the TDD uplink-downlink configuration 5, when $k_{PHICH}$ is 7, or for the TDD uplink-downlink configuration 6, when $k_{PHICH}$ is 3, 4, 5, 8, 9, or 10, then the subframe $n+k_{PHICH}$ includes $m_i * N_{PHICH}^{group}$ groups of PHICHs, where $m_i$ is a value defined in the 3GPP TS 36.211.

Where i is the subframe index of the subframe $n+k_{PHICH}$, $m_i$ is a coefficient for determining the number of PHICH groups corresponding to a subframe i in a TDD system, and $N_{PHICH}^{group}$ is the number of PHICH groups determined according to a parameter configured in high-layer signaling.

Optionally the processor 601 is configured:

To determine a PHICH resource, corresponding to the PUSCH transmitted in the special subframe n, in the subframe $n+k_{PHICH}$ according to the lowest PRB index of the PUSCH transmitted in the special subframe n, DMRS cyclic shift information indicated in scheduling information of the PUSCH, and a prescribed or preconfigured value of $I_{PHICH}$ corresponding to the PUSCH transmitted in the special subframe n; and To transmit the PHICH corresponding to the PUSCH in the subframe $n+k_{PHICH}$ according to the determined PHICH resource.

Where the lowest PRB index of the PUSCH transmitted in the special subframe n is different from the lowest PRB index of a PUSCH transmitted in a corresponding uplink subframe for which the PHICH is transmitted according to the value of $I_{PHICH}$ in the subframe $n+k_{PHICH}$, and/or the DMRS cyclic shift information indicated in the scheduling information of the PUSCH transmitted in the special subframe n is different from DMRS cyclic shift information indicated in scheduling information of a PUSCH transmitted in a corresponding uplink subframe for which the PHICH is received according to the value of $I_{PHICH}$ in the subframe $n+k_{PHICH}$.

Optionally for the TDD uplink-downlink configuration 0, when the subframe $n+k_{PHICH}$ is the subframe 1 or 6, or for the TDD uplink-downlink configuration 1, when the subframe $n+k_{PHICH}$ is the subframe 1, 4, 6, or 9, or for the TDD uplink-downlink configuration 2, when the subframe $n+k_{PHICH}$ is the subframe 3 or 8, or for the TDD uplink-downlink configuration 3, when the subframe $n+k_{PHICH}$ is the subframe 0, 8, or 9, or for the TDD uplink-downlink configuration 4, when the subframe $n+k_{PHICH}$ is the subframe 8 or 9, or for the TDD uplink-downlink configuration 5, when the subframe $n+k_{PHICH}$ is the subframe 8, or for the TDD uplink-downlink configuration 6, when the subframe $n+k_{PHICH}$ is the subframe 0, 1, 5, 6, or 9, then the subframe $n+k_{PHICH}$ includes $m_i * N_{PHICH}^{group}$ groups of PHICHs, where $m_i$ is 2.

Where i is the subframe index of the subframe $n+k_{PHICH}$, and $N_{PHICH}^{group}$ is the number of PHICH groups determined according to a parameter configured in high-layer signaling.

Optionally the feedback module 401 is configured:

To determine $I_{PHICH}$ corresponding to the PUSCH transmitted in the special subframe n to be $I_{PHICH}=1$, and to determine a PHICH resource, corresponding to the PUSCH, in the subframe $n+k_{PHICH}$ according to the value of $I_{PHICH}$; and To transmit the PHICH corresponding to the PUSCH in the subframe $n+k_{PHICH}$ according to the determined PHICH resource.

Where $I_{PHICH}$ is the parameter for determining the PHICH resource.

Optionally for the TDD uplink-downlink configuration 0, when the subframe $n+k_{PHICH}$ is the subframe 0 or 5, then the subframe $n+k_{PHICH}$ includes $m_i * N_{PHICH}^{group}$ groups of PHICHs, where $m_i$ is 3.

Where i is the subframe index of the subframe $n+k_{PHICH}$, and $N_{PHICH}^{group}$ is the number of PHICH groups determined according to a parameter configured in high-layer signaling.

Optionally the processor 601 is configured:

To determine $I_{PHICH}$ corresponding to the PUSCH transmitted in the special subframe n to be $I_{PHICH}=2$, and to determine a PHICH resource, corresponding to the PUSCH, in the subframe $n+k_{PHICH}$ according to the value of $I_{PHICH}$; and To transmit the PHICH corresponding to the PUSCH in the subframe $n+k_{PHICH}$ according to the determined PHICH resource.

Where $I_{PHICH}$ is the parameter for determining the PHICH resource.

Here in FIG. 6, in the bus architecture (represented as the bus 600), the bus 600 can include any number of interconnecting buses and bridges to particularly link together various circuits including one or more processors represented by the processor 601, and one or more memories represented by the memory 604. The bus 600 can further link together various other circuits, e.g., a peripheral device, a manostat, a power management circuit, etc., all of which are well known in the art, so a further description thereof will be omitted in this context. The bus interface 603 serves as an interface between the bus 600 and the transceiver 602. The transceiver 602 can be an element, or a number of elements, e.g., a number of transmitters and receivers, which are units for communication with various other devices over a transmission medium. Data processed by the processor 601 are transmitted over a wireless medium through the antenna 605, and furthermore the antenna 605 further receives data and transmits the data to the processor 601.

The processor 601 is configured for managing the bus 600 and performing normal processes, and the memory 604 can store data for use by the processor 601 in performing the operations.

Optionally the processor 601 can be a CPU, an ASIC, an FPGA, or a CPLD.

Based upon the same inventive idea, an embodiment of the invention further provides a method for receiving feedback information, and since the method addresses the problem under a similar principle to the UE in the system for transmitting feedback information according to the embodiment of the invention, reference can be made to the implementation of the UE in the system for transmitting feedback information according to the embodiment of the invention for an implementation of the method, and a repeated description thereof will be omitted here.

Figure 7:
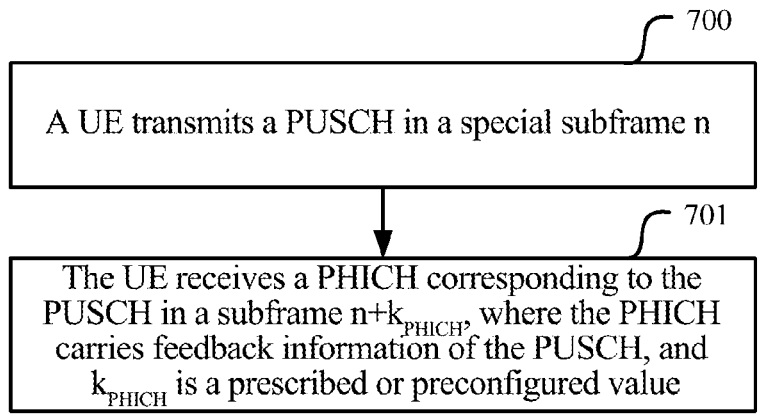
FIG. 7 is a schematic flow chart of a method for receiving feedback information according to an embodiment of the invention.

As illustrated in FIG. 7, a method for receiving feedback information according to an embodiment of the invention includes the following steps.

In the step 700, a UE transmits a PUSCH in a special subframe n.

In the step 701, the UE receives a PHICH corresponding to the PUSCH in a subframe $n+k_{PHICH}$, where the PHICH carries feedback information of the PUSCH, and $k_{PHICH}$ is a prescribed or preconfigured value.

Optionally for the TDD uplink-downlink configuration 0, when n is 1 or 6, then $k_{PHICH}$ is one of 4, 5, 9, and 10; or For the TDD uplink-downlink configuration 1, when n is 1 or 6, then $k_{PHICH}$ is one of 3, 4, 5, 8, 9, and 10; or For the TDD uplink-downlink configuration 2, when n is 1 or 6, then $k_{PHICH}$ is one of 2, 3, 4, 5, 7, 8, 9, and 10; or For the TDD uplink-downlink configuration 3, when n is 1, then $k_{PHICH}$ is one of 4, 5, 6, 7, 8, 9, and 10; or For the TDD uplink-downlink configuration 4, when n is 1, then $k_{PHICH}$ is one of 3, 4, 5, 6, 7, 8, 9, and 10; or For the TDD uplink-downlink configuration 5, when n is 1, then $k_{PHICH}$ is one of 2, 3, 4, 5, 6, 7, 8, 9, and 10; or For the TDD uplink-downlink configuration 6, when n is 1, then $k_{PHICH}$ is one of 4, 5, 8, 9, and 10; or For the TDD uplink-downlink configuration 6, when n is 6, then $k_{PHICH}$ is one of 3, 4, 5, 9, and 10.

Where the TDD uplink-downlink configuration is an uplink reference TDD uplink-downlink configuration, or a TDD uplink-downlink configuration configured in system information.

Optionally for the TDD uplink-downlink configuration 1, when the subframe $n+k_{PHICH}$ is the subframe 0 or 5, or for the TDD uplink-downlink configuration 2, when the subframe $n+k_{PHICH}$ is the subframe 0, 1, 4, 5, 6, or 9, or for the TDD uplink-downlink configuration 3, when the subframe $n+k_{PHICH}$ is the subframe 1, 5, 6, or 7, or for the TDD uplink-downlink configuration 4, when the subframe $n+k_{PHICH}$ is the subframe 0, 1, 4, 5, 6, or 7, or for the TDD uplink-downlink configuration 5, when the subframe $n+k_{PHICH}$ is the subframe 0, 1, 3, 4, 5, 6, 7, or 9, then the subframe $n+k_{PHICH}$ includes $m_i * N_{PHICH}^{group}$ groups of PHICHs, where $m_i$ is 1.

Where i is the subframe index of the subframe $n+k_{PHICH}$, and $N_{PHICH}^{group}$ is the number of PHICH groups determined according to a parameter configured in high-layer signaling.

Optionally the UE receives the PHICH corresponding to the PUSCH in the subframe $n+k_{PHICH}$ as follows.

The UE determines $I_{PHICH}$ corresponding to the PUSCH transmitted in the special subframe n to be $I_{PHICH}=0$, and to determine a PHICH resource, corresponding to the PUSCH, in the subframe $n+k_{PHICH}$ according to the value of $I_{PHICH}$.

The UE receives the PHICH corresponding to the PUSCH in the subframe $n+k_{PHICH}$ according to the determined PHICH resource.

Where $I_{PHICH}$ is the parameter for determining the PHICH resource.

Optionally for the TDD uplink-downlink configuration 0, when $k_{PHICH}$ is 4, 5, 9, or 10, or for the TDD uplink-downlink configuration 1, when $k_{PHICH}$ is 3, 5, 8, or 10, or for the TDD uplink-downlink configuration 2, when $k_{PHICH}$ is 2 or 7, or for the TDD uplink-downlink configuration 3, when $k_{PHICH}$ is 7, 8, or 9, or for the TDD uplink-downlink configuration 4, when $k_{PHICH}$ is 7 or 8, or for the TDD uplink-downlink configuration 5, when $k_{PHICH}$ is 7, or for the TDD uplink-downlink configuration 6, when $k_{PHICH}$ is 3, 4, 5, 8, 9, or 10, then the subframe $n+k_{PHICH}$ includes $m_i * N_{PHICH}^{group}$ groups of PHICHs, where $m_i$ is a value defined in the 3GPP TS 36.211.

Where i is the subframe index of the subframe $n+k_{PHICH}$, $m_i$ is a coefficient for determining the number of PHICH groups corresponding to a subframe i in a TDD system, and $N_{PHICH}^{group}$ is the number of PHICH groups determined according to a parameter configured in high-layer signaling.

Optionally the UE receives the PHICH corresponding to the PUSCH in the subframe $n+k_{PHICH}$ as follows.

The UE determines a PHICH resource, corresponding to the PUSCH transmitted in the special subframe n, in the subframe $n+k_{PHICH}$ according to the lowest PRB index of the PUSCH transmitted in the special subframe n, DMRS cyclic shift information indicated in scheduling information of the PUSCH, and a prescribed or preconfigured value of $I_{PHICH}$ corresponding to the PUSCH transmitted in the special subframe n.

The UE receives the PHICH corresponding to the PUSCH in the subframe $n+k_{PHICH}$ according to the determined PHICH resource.

Where the lowest PRB index of the PUSCH transmitted in the special subframe n is different from the lowest PRB index of a PUSCH transmitted in a corresponding uplink subframe for which the PHICH is received according to the value of $I_{PHICH}$ in the subframe $n+k_{PHICH}$, and/or the DMRS cyclic shift information indicated in the scheduling information of the PUSCH transmitted in the special subframe n is different from DMRS cyclic shift information indicated in scheduling information of a PUSCH transmitted in a corresponding uplink subframe for which the PHICH is received according to the value of $I_{PHICH}$ in the subframe $n+k_{PHICH}$.

Optionally for the TDD uplink-downlink configuration 0, when the subframe $n+k_{PHICH}$ is the subframe 1 or 6, or for the TDD uplink-downlink configuration 1, when the subframe $n+k_{PHICH}$ is the subframe 1, 4, 6, or 9, or for the TDD uplink-downlink configuration 2, when the subframe $n+k_{PHICH}$ is the subframe 3 or 8, or for the TDD uplink-downlink configuration 3, when the subframe $n+k_{PHICH}$ is the subframe 0, 8, or 9, or for the TDD uplink-downlink configuration 4, when the subframe $n+k_{PHICH}$ is the subframe 8 or 9, or for the TDD uplink-downlink configuration 5, when the subframe $n+k_{PHICH}$ is the subframe 8, or for the TDD uplink-downlink configuration 6, when the subframe $n+k_{PHICH}$ is the subframe 0, 1, 5, 6, or 9, then the subframe $n+k_{PHICH}$ includes $m_i * N_{PHICH}^{group}$ groups of PHICHs, where $m_i$ is 2.

Where i is the subframe index of the subframe $n+k_{PHICH}$, and $N_{PHICH}^{group}$ is the number of PHICH groups determined according to a parameter configured in high-layer signaling.

Optionally the UE receives the PHICH corresponding to the PUSCH in the subframe $n+k_{PHICH}$ as follows.

The UE determines $I_{PHICH}$ corresponding to the PUSCH transmitted in the special subframe n to be $I_{PHICH}=1$, and to determine a PHICH resource, corresponding to the PUSCH, in the subframe $n+k_{PHICH}$ according to the value of $I_{PHICH}$.

The UE receives the PHICH corresponding to the PUSCH in the subframe $n+k_{PHICH}$ according to the determined PHICH resource.

Where $I_{PHICH}$ is the parameter for determining the PHICH resource.

Optionally for the TDD uplink-downlink configuration 0, when the subframe $n+k_{PHICH}$ is the subframe 0 or 5, then the subframe $n+k_{PHICH}$ includes $m_i * N_{PHICH}^{group}$ groups of PHICHs, where $m_i$ is 3.

Where i is the subframe index of the subframe $n+k_{PHICH}$, and $N_{PHICH}^{group}$ is the number of PHICH groups determined according to a parameter configured in high-layer signaling.

Optionally the UE receives the PHICH corresponding to the PUSCH in the subframe $n+k_{PHICH}$ as follows.

The UE determines $I_{PHICH}$ corresponding to the PUSCH transmitted in the special subframe n to be $I_{PHICH}=2$, and determines a PHICH resource, corresponding to the PUSCH, in the subframe $n+k_{PHICH}$ according to the value of $I_{PHICH}$.

The UE receives the PHICH corresponding to the PUSCH in the subframe $n+k_{PHICH}$ according to the determined PHICH resource.

Where $I_{PHICH}$ is the parameter for determining the PHICH resource.

Based upon the same inventive idea, an embodiment of the invention further provides a method for transmitting the feedback information, and since the method addresses the problem under a similar principle to the network-side device in the system for transmitting feedback information according to the embodiment of the invention, reference can be made to the implementation of the network-side device in the system for transmitting feedback information according to the embodiment of the invention for an implementation of the method, and a repeated description thereof will be omitted here.

Figure 8:
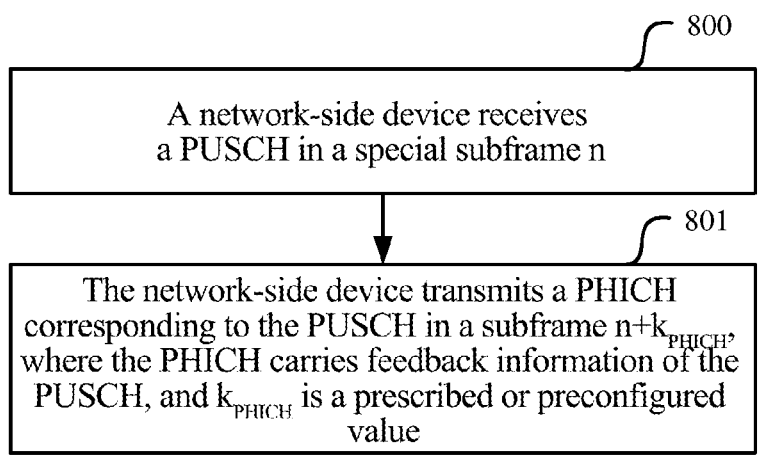
FIG. 8 is a schematic flow chart of a method for transmitting feedback information according to an embodiment of the invention.

As illustrated in FIG. 8, a method for transmitting feedback information according to an embodiment of the invention includes the following steps.

In the step 800, a network-side device receives a PUSCH in a special subframe n.

In the step 801, the network-side device transmits a PHICH corresponding to the PUSCH in a subframe $n+k_{PHICH}$, where the PHICH carries feedback information of the PUSCH, and $k_{PHICH}$ is a prescribed or preconfigured value.

Optionally for the TDD uplink-downlink configuration 0, when n is 1 or 6, then $k_{PHICH}$ is one of 4, 5, 9, and 10; or For the TDD uplink-downlink configuration 1, when n is 1 or 6, then $k_{PHICH}$ is one of 3, 4, 5, 8, 9, and 10; or For the TDD uplink-downlink configuration 2, when n is 1 or 6, then $k_{PHICH}$ is one of 2, 3, 4, 5, 7, 8, 9, and 10; or For the TDD uplink-downlink configuration 3, when n is 1, then $k_{PHICH}$ is one of 4, 5, 6, 7, 8, 9, and 10; or For the TDD uplink-downlink configuration 4, when n is 1, then $k_{PHICH}$ is one of 3, 4, 5, 6, 7, 8, 9, and 10; or For the TDD uplink-downlink configuration 5, when n is 1, then $k_{PHICH}$ is one of 2, 3, 4, 5, 6, 7, 8, 9, and 10; or For the TDD uplink-downlink configuration 6, when n is 1, then $k_{PHICH}$ is one of 4, 5, 8, 9, and 10; or For the TDD uplink-downlink configuration 6, when n is 6, then $k_{PHICH}$ is one of 3, 4, 5, 9, and 10.

Where the TDD uplink-downlink configuration is an uplink reference TDD uplink-downlink configuration, or a TDD uplink-downlink configuration configured in system information.

Optionally for the TDD uplink-downlink configuration 1, when the subframe $n+k_{PHICH}$ is the subframe 0 or 5, or for the TDD uplink-downlink configuration 2, when the subframe $n+k_{PHICH}$ is the subframe 0, 1, 4, 5, 6, or 9, or for the TDD uplink-downlink configuration 3, when the subframe $n+k_{PHICH}$ is the subframe 1, 5, 6, or 7, or for the TDD uplink-downlink configuration 4, when the subframe $n+k_{PHICH}$ is the subframe 0, 1, 4, 5, 6, or 7, or for the TDD uplink-downlink configuration 5, when the subframe $n+k_{PHICH}$ is the subframe 0, 1, 3, 4, 5, 6, 7, or 9, then the subframe $n+k_{PHICH}$ includes $m_i * N_{PHICH}^{group}$ groups of PHICHs, where $m_i$ is 1.

Where i is the subframe index of the subframe $n+k_{PHICH}$, and $N_{PHICH}^{group}$ is the number of PHICH groups determined according to a parameter configured in high-layer signaling.

Optionally the network-side device transmits the PHICH corresponding to the PUSCH in the subframe $n+k_{PHICH}$ as follows.

The network-side device determines $I_{PHICH}$ corresponding to the PUSCH transmitted in the special subframe n to be $I_{PHICH}=0$, and determines a PHICH resource, corresponding to the PUSCH, in the subframe $n+k_{PHICH}$ according to the value of $I_{PHICH}$.

The network-side device transmits the PHICH corresponding to the PUSCH in the subframe $n+k_{PHICH}$ according to the determined PHICH resource.

Where $I_{PHICH}$ is the parameter for determining the PHICH resource.

Optionally for the TDD uplink-downlink configuration 0, when $k_{PHICH}$ is 4, 5, 9, or 10, or for the TDD uplink-downlink configuration 1, when $k_{PHICH}$ is 3, 5, 8, or 10, or for the TDD uplink-downlink configuration 2, when $k_{PHICH}$ is 2 or 7, or for the TDD uplink-downlink configuration 3, when $k_{PHICH}$ is 7, 8, or 9, or for the TDD uplink-downlink configuration 4, when $k_{PHICH}$ is 7 or 8, or for the TDD uplink-downlink configuration 5, when $k_{PHICH}$ is 7, or for the TDD uplink-downlink configuration 6, when $k_{PHICH}$ is 3, 4, 5, 8, 9, or 10, then the subframe $n+k_{PHICH}$ includes $m_i * N_{PHICH}^{group}$ groups of PHICHs, where $m_i$ is a value defined in the 3GPP TS 36.211.

Where i is the subframe index of the subframe $n+k_{PHICH}$, $m_i$ is a coefficient for determining the number of PHICH groups corresponding to a subframe i in a TDD system, and $N_{PHICH}^{group}$ is the number of PHICH groups determined according to a parameter configured in high-layer signaling.

Optionally the network-side device transmits the PHICH corresponding to the PUSCH in the subframe $n+k_{PHICH}$ as follows.

The network-side device determines a PHICH resource, corresponding to the PUSCH transmitted in the special subframe n, in the subframe $n+k_{PHICH}$ according to the lowest PRB index of the PUSCH transmitted in the special subframe n, DMRS cyclic shift information indicated in scheduling information of the PUSCH, and a prescribed or preconfigured value of $I_{PHICH}$ corresponding to the PUSCH transmitted in the special subframe n.

The network-side device transmits the PHICH corresponding to the PUSCH in the subframe $n+k_{PHICH}$ according to the determined PHICH resource.

Where the lowest PRB index of the PUSCH transmitted in the special subframe n is different from the lowest PRB index of a PUSCH transmitted in a corresponding uplink subframe for which the PHICH is transmitted according to the value of $I_{PHICH}$ in the subframe $n+k_{PHICH}$, and/or the DMRS cyclic shift information indicated in the scheduling information of the PUSCH transmitted in the special subframe n is different from DMRS cyclic shift information indicated in scheduling information of a PUSCH transmitted in a corresponding uplink subframe for which the PHICH is received according to the value of $I_{PHICH}$ in the subframe $n+k_{PHICH}$.

Optionally for the TDD uplink-downlink configuration 0, when the subframe $n+k_{PHICH}$ is the subframe 1 or 6, or for the TDD uplink-downlink configuration 1, when the subframe $n+k_{PHICH}$ is the subframe 1, 4, 6, or 9, or for the TDD uplink-downlink configuration 2, when the subframe $n+k_{PHICH}$ is the subframe 3 or 8, or for the TDD uplink-downlink configuration 3, when the subframe $n+k_{PHICH}$ is the subframe 0, 8, or 9, or for the TDD uplink-downlink configuration 4, when the subframe $n+k_{PHICH}$ is the subframe 8 or 9, or for the TDD uplink-downlink configuration 5, when the subframe $n+k_{PHICH}$ is the subframe 8, or for the TDD uplink-downlink configuration 6, when the subframe $n+k_{PHICH}$ is the subframe 0, 1, 5, 6, or 9, then the subframe $n+k_{PHICH}$ includes $m_i * N_{PHICH}^{group}$ groups of PHICHs, where $m_i$ is 2.

Where i is the subframe index of the subframe $n+k_{PHICH}$, and $N_{PHICH}^{group}$ is the number of PHICH groups determined according to a parameter configured in high-layer signaling.

Optionally the network-side device transmits the PHICH corresponding to the PUSCH in the subframe $n+k_{PHICH}$ as follows.

The network-side device determines $I_{PHICH}$ corresponding to the PUSCH transmitted in the special subframe n to be $I_{PHICH}=1$, and determines a PHICH resource, corresponding to the PUSCH, in the subframe $n+k_{PHICH}$ according to the value of $I_{PHICH}$.

The network-side device transmits the PHICH corresponding to the PUSCH in the subframe $n+k_{PHICH}$ according to the determined PHICH resource.

Where $I_{PHICH}$ is the parameter for determining the PHICH resource.

Optionally for the TDD uplink-downlink configuration 0, when the subframe $n+k_{PHICH}$ is the subframe 0 or 5, then the subframe $n+k_{PHICH}$ includes $m_i * N_{PHICH}^{group}$ groups of PHICHs, where $m_i$ is 3.

Where i is the subframe index of the subframe $n+k_{PHICH}$, and $N_{PHICH}^{group}$ is the number of PHICH groups determined according to a parameter configured in high-layer signaling.

Optionally the network-side device transmits the PHICH corresponding to the PUSCH in the subframe $n+k_{PHICH}$ as follows.

The network-side device determines $I_{PHICH}$ corresponding to the PUSCH transmitted in the special subframe n to be $I_{PHICH}=2$, and to determine a PHICH resource, corresponding to the PUSCH, in the subframe $n+k_{PHICH}$ according to the value of $I_{PHICH}$.

The network-side device transmits the PHICH corresponding to the PUSCH in the subframe $n+k_{PHICH}$ according to the determined PHICH resource.

Where $I_{PHICH}$ is the parameter for determining the PHICH resource.

The solutions according to the invention will be described below in details by way of several examples.

First Embodiment

Taking the TDD uplink-downlink configuration 1 as an example, a PUSCH is transmitted in an UpPTS in the special subframe 1 or 6, and for example, when $k_{PHICH}=4$ is defined, so $k_{PHICH}$ of each instance of uplink transmission in the TDD uplink-downlink configuration 1 is defined as follows.

The sub-frame 5 is detected for a PHICH of a PUSCH transmitted in the special subframe 1, and the subframe 0 in a next radio frame is detected for a PHICH of a PSUCH transmitted in the special subframe 6. As defined in Table 4, $m_i$ is 0 in the subframes 0 and 5, that is, there is no PHICH resource. In order to support transmission of feedback information of a PUSCH in an UpPTS over a PHICH, $m_i=1$ in the subframes 0 and 5 shall be defined, that is, there are $m_i * N_{PHICH}^{group} = N_{PHICH}^{group}$ groups of PHICH resources in the subframes 0 and 5 as depicted in Table 5.

TABLE 5

| Uplink-downlink | Subframe index i | | | | | | | | | |
|---|---|---|---|---|---|---|---|---|---|---|
| configuration | 0 | 1 | 2 | 3 | 4 | 5 | 6 | 7 | 8 | 9 |
| 1 | 1 | 1 | 0 | 0 | 1 | 1 | 1 | 0 | 0 | 1 |

With a downlink bandwidth $N_{RB}^{DL}=100$ RBs of the system, preconfigured Ng=⅙, and a normal CP, $N_{PHICH}^{group}=3$ is determined in Equation (1) below, that is, there are three groups of PHICH resources in the subframes 0 and 5, where $n_{PHICH}^{group}$ is the PHICH number, which can be 0, 1, or 2; and $n_{PHICH}^{seq}$ is an orthogonal sequence number in each group, which can range from 0 to 7 for a normal Cyclic Prefix (CP).

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{Equation (1)}$$

| TDD UL/DL | | | | Subframe index n | | | | | | |
|---|---|---|---|---|---|---|---|---|---|---|
| Configuration | 0 | 1 | 2 | 3 | 4 | 5 | 6 | 7 | 8 | 9 |
| 1 | | 4 | 4 | 6 | | | | 4 | 4 | 6 |

| TDD UL/DL | | | | Subframe index n | | | | | | |
|---|---|---|---|---|---|---|---|---|---|---|
| Configuration | 0 | 1 | 2 | 3 | 4 | 5 | 6 | 7 | 8 | 9 |
| 1 | | 5 | 4 | 6 | | | | 5 | 4 | 6 |

At the eNB Side

The eNB schedules the UE to transmit a PUSCH in the special subframe 1, where the lowest PRB index thereof is 0, and a DMRS cyclic shift state indicated in DCI (i.e., a PDCCH/EPDCCH (Enhanced Physical Downlink Control Channel) carrying a UL grant) scheduling the PUSCH is "000"; receives the PUSCH transmitted by the UE in the special subframe 1, and obtains 1 bit of ACK/NACK feedback information thereof; determines $I_{PRB\_RA}=0$ according to the lowest PRB index, determines $n_{DMRS}=0$ according to Table 3, and as prescribed: all the other PUSCHs than a PUSCH in a subframe 4 or 9 in the TDD configuration 0 correspond to $I_{PHICH}=0$, then determines that the PUSCH in the special subframe 1 corresponds to $I_{PHICH}=0$; and can determine PHICH resource parameters of the PUSCH, i.e., $n_{PHICH}^{group}=0$, and $n_{PHICH}^{seq}=0$, according to Equation (2) below, and thus encode and modulate the 1 bit of ACK/NACK feedback information of the PUSCH, spread it orthogonally using an orthogonal sequence corresponding to $n_{PHICH}^{seq}=0$, and then map it onto a PHICH resource corresponding to $n_{PHICH}^{group}=0$, and transmit it over the PHICH resource.

$$N_{PHICH}^{group} = (I_{PRB\_RA} + n_{DMRS}) \bmod N_{PHICH}^{group} + I_{PHICH} N_{PHICH}^{group}$$
$$N_{PHICH}^{seq} = (\lfloor I_{PRB\_RA} / N_{PHICH}^{group} \rfloor + n_{DMRS}) \bmod 2N_{SF}^{PHICH}$$

Equation (2)

At the UE Side

The UE receives scheduling information of the PUSCH, obtains the lowest PRB index and the indicated DMRS cyclic shift state of the PUSCH, and transmits the PUSCH in the special subframe 1 according to the scheduling information.

The UE determines the PHICH resource parameters of the PUSCH, i.e., $n_{PHICH}^{group}=0$, and $n_{PHICH}^{seq}=0$, in the same way above as the eNB side, and thus detects the PHICH resource corresponding to $n_{PHICH}^{group}=0$ for the PHICH using the orthogonal sequence corresponding to $n_{PHICH}^{seq}=0$, and further demodulates, decodes, etc., the PHICH into the 1 bit of ACK/NACK feedback information of the PUSCH.

Second Embodiment

Taking the TDD uplink-downlink configuration 1 as an example, a PUSCH is transmitted in an UpPTS in the special subframe 1 or 6, and when $k_{PHICH}=5$ is defined, then $k_{PHICH}$ of each instance of uplink transmission in the TDD uplink-downlink configuration 1 is defined as follows.

The subframe 6 is detected for a PHICH of each of PUSCHs transmitted in the special subframe 1 and the uplink subframe 2, and the subframe 1 in a next radio frame is detected for a PHICH of each of PUSCHs transmitted in the special subframe 6 and the uplink subframe 7; and with a downlink bandwidth $N_{RB}^{DL}=100$ RBs of the system, preconfigured Ng=⅙, and a normal CP, $N_{PHICH}^{group}=3$ is determined in Equation (1), where $n_{PHICH}^{seq}$ is the number of an orthogonal sequence in each group, which can range from 0 to 7 for a normal CP.

First Scheme

When PHICH resources in the system are not extended, then as defined in Table 4, $m_i$ is 1 in the subframes 1 and 6, that is, there are only $m_i * N_{PHICH}^{group} = N_{PHICH}^{group}=3$ groups of PHICH resources, where $n_{PHICH}^{group}$ is the PHICH number, which can be 0, 1, or 2.

At the eNB Side

The eNB schedules the UE to transmit a PUSCH-1 in the special subframe 1, where the lowest PRB index thereof is 0, and a DMRS cyclic shift state indicated in DCI (i.e., a PDCCH/EPDCCH carrying a UL grant) scheduling the PUSCH is "000"; receives the PUSCH-1 transmitted by the UE in the special subframe 1, and obtains 1 bit of ACK/NACK feedback information thereof; determines $I_{PRB\_RA}=0$ according to the lowest PRB index, determines $n_{DMRS}=0$ according to Table 3, and as prescribed: all the other PUSCHs than a PUSCH in a subframe 4 or 9 in the TDD configuration 0 correspond to $I_{PHICH}=0$, determines that the PUSCH-1 corresponds to $I_{PHICH}=0$; and can determine PHICH resource parameters of the PUSCH-1, i.e., $n_{PHICH}^{group}=0$, and $n_{PHICH}^{seq}=0$, according to Equation (2), and thus encode and modulate the 1 bit of ACK/NACK feedback information of the PUSCH-1, spread it orthogonally using an orthogonal sequence corresponding to $n_{PHICH}^{seq}=0$, and then map it onto a PHICH resource corresponding to $n_{PHICH}^{group}=0$, and transmit it over the PHICH resource.

The eNB schedules the UE to transmit a PUSCH-2 in the uplink subframe 2, where the lowest PRB index thereof is 0, and a DMRS cyclic shift state indicated in DCI (i.e., a PDCCH/EPDCCH carrying a UL grant) scheduling the PUSCH is "001"; receives the PUSCH-2 transmitted by the UE in the uplink subframe 2, and obtains 1 bit of ACK/NACK feedback information thereof; determines $I_{PRB\_RA}=0$ according to the lowest PRB index, determines $n_{DMRS}=1$ according to Table 5, and as prescribed: all the other PUSCHs than a PUSCH in a subframe 4 or 9 in the TDD configuration 0 correspond to $I_{PHICH}=0$, determines that the PUSCH-2 corresponds to $I_{PHICH}=0$; and can determine PHICH resource parameters of the PUSCH-2, i.e., $n_{PHICH}^{group}=0$, and $n_{PHICH}^{seq}=1$, according to Equation (2), and thus encode and modulate the 1 bit of ACK/NACK feedback information of the PUSCH-2, spread it orthogonally using an orthogonal sequence corresponding to $n_{PHICH}^{seq}=1$, and then map it onto a PHICH resource corresponding to $n_{PHICH}^{group}=0$, and transmit it over the PHICH resource. Since the orthogonal sequences of the PUSCH-1 and the PUSCH-2 are different, they can be distinguished using the orthogonal sequences although they are mapped onto the same resource.

At the UE Side

The UE receives scheduling information of the PUSCH-1, obtains the lowest PRB index and the indicated DMRS cyclic shift state of the PUSCH-1, and transmits the PUSCH-1 in the special subframe 1 according to the scheduling information; and receives scheduling information of the PUSCH-2, obtains the lowest PRB index and the indicated DMRS cyclic shift state of the PUSCH-2, and transmits the PUSCH-2 in the uplink subframe 2 according to the scheduling information.

The UE determines the PHICH resource parameters of the PUSCH-1, i.e., $n_{PHICH}^{group}=0$, and $n_{PHICH}^{seq}=0$, in the same way above as the eNB side, and thus detects the PHICH resource corresponding to $n_{PHICH}^{group}=0$ for the PHICH using the orthogonal sequence corresponding to $n_{PHICH}^{seq}=0$, and further demodulates, decodes, etc., the PHICH into the 1 bit of ACK/NACK feedback information of the PUSCH-1; and determines the PHICH resource parameters of the PUSCH-2, i.e., $n_{PHICH}^{group}=0$, and $n_{PHICH}^{seq}=1$, in the same way above as the eNB side, and thus detects the PHICH resource corresponding to $n_{PHICH}^{group}=0$ for the PHICH using the orthogonal sequence corresponding to $n_{PHICH}^{seq}=1$, and further demodulates, decodes, etc., the PHICH into the 1 bit of ACK/NACK feedback information of the PUSCH-2.

Second Scheme

PHICH resources in the system are extended, and $m_i=2$ is defined in the subframes 1 and 6, that is, there are $m_i*N_{PHICH}^{group}=2$ $N_{PHICH}^{group}=6$ groups of PHICH resources, where $n_{PHICH}^{group}$ is a PHICH number, which can be 0 to 5; and it is defined that a PUSCH transmitted in an UpPTS or a special subframe corresponds to $I_{PHICH}=0$.

At the eNB Side

The eNB schedules the UE to transmit a PUSCH-1 in the special subframe 1, where the lowest PRB index thereof is 0, and a DMRS cyclic shift state indicated in DCI (i.e., a PDCCH/EPDCCH carrying a UL grant) scheduling the PUSCH is "000"; receives the PUSCH-1 transmitted by the UE in the special subframe 1, and obtains 1 bit of ACK/NACK feedback information thereof; determines $I_{PRB\_RA}=0$ according to the lowest PRB index, determines $n_{DMRS}=0$ according to Table 5, and determines that the PUSCH-1 corresponds to $I_{PHICH}=1$, as prescribed above for $I_{PHICH}$; and can determine PHICH resource parameters of the PUSCH-1, i.e., $n_{PHICH}^{group}=3$, and $n_{PHICH}^{seq}=0$, according to Equation (2), and thus encode and modulate the 1 bit of ACK/NACK feedback information of the PUSCH-1, spread it orthogonally using an orthogonal sequence corresponding to $n_{PHICH}^{seq}=0$, and then map it onto a PHICH resource corresponding to $n_{PHICH}^{group}=3$, and transmit it over the PHICH resource.

The eNB schedules the UE to transmit a PUSCH-2 in the uplink subframe 2, where the lowest PRB index thereof is 0, and a DMRS cyclic shift state indicated in DCI (i.e., a PDCCH/EPDCCH carrying a UL grant) scheduling the PUSCH is "000"; receives the PUSCH-2 transmitted by the UE in the uplink subframe 2, and obtains 1 bit of ACK/NACK feedback information thereof; determines $I_{PRB\_RA}=0$ according to the lowest PRB index, determines $n_{DMRS}=0$ according to Table 5, and determines that the PUSCH-2 corresponds to $I_{PHICH}=0$, as prescribed above; and can determine PHICH resource parameters of the PUSCH-2, i.e., $n_{PHICH}^{group}=0$, and $n_{PHICH}^{seq}=0$, according to Equation (2), and thus encode and modulate the 1 bit of ACK/NACK feedback information of the PUSCH-2, spread it orthogonally using an orthogonal sequence corresponding to $n_{PHICH}^{seq}=0$, and then map it onto a PHICH resource corresponding to $n_{PHICH}^{group}=0$, and transmit it over the PHICH resource. Although the orthogonal sequences of the PUSCH-1 and the PUSCH-2 are the same, they can be distinguished because they are transmitted over the different PHICH resources.

At the UE Side

The UE receives scheduling information of the PUSCH-1, obtains the lowest PRB index and the indicated DMRS cyclic shift state of the PUSCH-1, and transmits the PUSCH-1 in the special subframe 1 according to the scheduling information; and receives scheduling information of the PUSCH-2, obtains the lowest PRB index and the indicated DMRS cyclic shift state of the PUSCH-2, and transmits the PUSCH-2 in the uplink subframe 2 according to the scheduling information.

The UE determines the PHICH resource parameters of the PUSCH-1, i.e., $n_{PHICH}^{group}=3$, and $n_{PHICH}^{seq}=0$, in the same way above as the eNB side, and thus detects the PHICH resource corresponding to $n_{PHICH}^{group}=3$ for the PHICH using the orthogonal sequence corresponding to $n_{PHICH}^{seq}=0$, and further demodulates, decodes, etc., the PHICH into the 1 bit of ACK/NACK feedback information of the PUSCH-1; and determines the PHICH resource parameters of the PUSCH-2, i.e., $n_{PHICH}^{group}=0$, and $n_{PHICH}^{seq}=0$, in the same way above as the eNB side, and thus detects the PHICH resource corresponding to $n_{PHICH}^{group}=0$ for the PHICH using the orthogonal sequence corresponding to $n_{PHICH}^{seq}=0$, and further demodulates, decodes, etc., the PHICH into the 1 bit of ACK/NACK feedback information of the PUSCH-2.

As can be apparent from the disclosure, in the embodiments of the invention, the UE transmits a PUSCH in a special subframe n, and receives a PHICH corresponding to the PUSCH in a subframe $n+k_{PHICH}$, where the PHICH carries feedback information of the PUSCH; and a network-side device receives the PUSCH in the special subframe n, and transmits the PHICH corresponding to the PSUCH in the subframe $n+k_{PHICH}$, so that ACK/NACK can be fed back for the PUSCH transmitted in an UpPTS.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

Correspondingly the invention can be further embodied in hardware and/or software (including firmware, resident software, micro-codes, etc.). Still furthermore the invention can be embodied in the form of a computer program product on a computer useable or readable storage medium, where the computer program product includes computer useable or readable program codes embodied in the medium to be used by or in connection with an instruction executing system. In the context of the invention, the computer useable or readable medium can be any medium which can include, store, communicate, transmit, or transport program to be used by or in connection with an instruction executing system, apparatus or device.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for receiving feedback information of Physical Uplink Shared Channel, the method comprising:

transmitting, by a User Equipment (UE), a Physical Uplink Shared Channel (PUSCH) in a special subframe n, wherein n is a subframe index of the special subframe; and receiving, by the UE, a Physical Hybrid Automatic Repeat Request (HARQ) Indicating Channel (PHICH) corresponding to the PUSCH in a subframe $n+k_{PHICH}$, wherein the PHICH carries feedback information of the PUSCH, and $k_{PHICH}$ is a prescribed or preconfigured value to determine subframe $n+k_{PHICH}$;

wherein:

for a Time Division Duplex (TDD) uplink-downlink configuration 0, when n is 1 or 6, then $k_{PHICH}$ is one of 4, 5, 9, and 10; or for a TDD uplink-downlink configuration 1, when n is 1 or 6, then $k_{PHICH}$ is one of 3, 5, 8, 9, and 10; or for a TDD uplink-downlink configuration 2, when n is 1 or 6, then $k_{PHICH}$ is one of 2, 3, 4, 5, 7, 8, 9, and 10; or for a TDD uplink-downlink configuration 3, when n is 1, then $k_{PHICH}$ is one of 4, 5, 7, 8, 9, and 10; or for a TDD uplink-downlink configuration 4, when n is 1, then $k_{PHICH}$ is one of 3, 4, 5, 7, 8, 9, and 10; or for a TDD uplink-downlink configuration 5, when n is 1, then $k_{PHICH}$ is one of 2, 3, 4, 5, 7, 8, 9, and 10; or for a TDD uplink-downlink configuration 6, when n is 1, then $k_{PHICH}$ is one of 4, 5, 8, 9, and 10; or for a TDD uplink-downlink configuration 6, when n is 6, then $k_{PHICH}$ is one of 3, 4, 5, 9, and 10;

wherein the TDD uplink-downlink configuration is an uplink reference TDD uplink-downlink configuration, or a TDD uplink-downlink configuration configured in system information;

for the TDD uplink-downlink configuration 0, a number of PHICH groups in the subframe $n+k_{PHICH}$ determined by at least one of scheme 2 and scheme 4 below;

for the TDD uplink-downlink configuration 1, a number of PHICH groups in the subframe $n+k_{PHICH}$ determined by at least one of scheme 2 and scheme 3 below;

for the TDD uplink-downlink configuration 2-5, a number of PHICH groups in the subframe $n+k_{PHICH}$ determined by at least one of scheme 1 to scheme 3 below; for the TDD uplink-downlink configuration 6, a number of PHICH groups in the subframe n+kPHICH determined by at least one of scheme 2 or scheme 3 below;

wherein scheme 1:

for the TDD uplink-downlink configuration 1, when the subframe $n+k_{PHICH}$ is the subframe 0 and the subframe $k_{PHICH}$ is the subframe 9, or when the subframe $n+k_{PHICH}$ is the subframe 5 and the subframe $k_{PHICH}$ is the subframe 9, or for the TDD uplink-downlink configuration 2, when the subframe $n+k_{PHICH}$ is the subframe 0, 4, 5, or 9, or the subframe $n+k_{PHICH}$ is the subframe 1 and the subframe $k_{PHICH}$ is the subframe 10, or the subframe $n+k_{PHICH}$ is the subframe 6 and the subframe $k_{PHICH}$ is the subframe 10, or for the TDD uplink-downlink configuration 3, when the subframe $n+k_{PHICH}$ is the subframe 1, 5, or 6, or for the TDD uplink-downlink configuration 4, when the subframe $n+k_{PHICH}$ is the subframe 0, 1, 4, 5, or 6, or for the TDD uplink-downlink configuration 5, when the subframe $n+k_{PHICH}$ is the subframe 0, 1, 3, 4, 5, 6, or 9, then the subframe $n+k_{PHICH}$ comprises $m_i*N_{PHICH}^{group}$ groups of PHICHs, wherein $m_i$ is 1;

wherein i is a subframe index of the subframe $n+k_{PHICH}$, and $N_{PHICH}^{group}$ is a number of PHICH groups determined according to a parameter configured in high-layer signaling;

scheme 2:

for the TDD uplink-downlink configuration 0, when $k_{PHICH}$ is 4, 5, 9, or 10, or for the TDD uplink-downlink configuration 1, when $k_{PHICH}$ is 3, 5, 8, or 10, or for the TDD uplink-downlink configuration 2, when $k_{PHICH}$ is 2 or 7, or for the TDD uplink-downlink configuration 3, when $k_{PHICH}$ is 7, 8, or 9, or for the TDD uplink-downlink configuration 4, when $k_{PHICH}$ is 7 or 8, or for the TDD uplink-downlink configuration 5, when $k_{PHICH}$ is 7, or for the TDD uplink-downlink configuration 6, when $k_{PHICH}$ is 3, 4, 5, 8, 9, or 10, then the subframe $n+k_{PHICH}$ comprises $m_i*N_{PHICH}^{group}$ groups of PHICHs, wherein $m_i$ is a value defined in 3GPP TS 36.211;

wherein i is a subframe index of the subframe $n+k_{PHICH}$, $m_i$ is a coefficient for determining the number of PHICH groups corresponding to a subframe i in a TDD system, and $N_{PHICH}^{group}$ is a number of PHICH groups determined according to a parameter configured in high-layer signaling;

scheme 3:

for the TDD uplink-downlink configuration 1, when the subframe $n+k_{PHICH}$ is the subframe 1, 4, 6, or 9, or for the TDD uplink-downlink configuration 2, when the subframe $n+k_{PHICH}$ is the subframe 3 or 8, or for the TDD uplink-downlink configuration 3, when the subframe $n+k_{PHICH}$ is the subframe 0, 8, or 9, or for the TDD uplink-downlink configuration 4, when the subframe $n+k_{PHICH}$ is the subframe 8 or 9, or for the TDD uplink-downlink configuration 5, when the subframe $n+k_{PHICH}$ is the subframe 8, or for the TDD uplink-downlink configuration 6, when the subframe $n+k_{PHICH}$ is the subframe 0, 5, or 9, then the subframe $n+k_{PHICH}$ comprises $m_i*N_{PHICH}^{group}$ groups of PHICHs, wherein $m_i$ is 2;

wherein i is a subframe index of the subframe $n+k_{PHICH}$, and $N_{PHICH}^{group}$ is a number of PHICH groups determined according to a parameter configured in high-layer signaling;

scheme 4:

for the TDD uplink-downlink configuration 0, when the subframe $n+k_{PHICH}$ is the subframe 0 or 5, then the subframe $n+k_{PHICH}$ comprises $m_i*N_{PHICH}^{group}$ groups of PHICHs, wherein $m_i$ is 3;

wherein i is a subframe index of the subframe $n+k_{PHICH}$, and $N_{PHICH}^{group}$ is the number of PHICH groups determined according to a parameter configured in high-layer signaling.

2. The method according to claim 1, wherein when mi is 1, receiving, by the UE, the PHICH corresponding to the PUSCH in the subframe $n+k_{PHICH}$ comprises:

determining, by the UE, IPHICH corresponding to the PUSCH transmitted in the special subframe n to be $I_{PHICH}=0$, and determining a PHICH resource, corresponding to the PUSCH, in the subframe $n+k_{PHICH}$ according to a value of $I_{PHICH}$; and receiving, by the UE, the PHICH corresponding to the PUSCH in the subframe $n+k_{PHICH}$ according to the determined PHICH resource;

wherein IPHICH is a parameter for determining the PHICH resource;

when mi is a value defined in the 3GPP TS 36.211, receiving, by the UE, the PHICH corresponding to the PUSCH in the subframe n+$k_{PHICH}$ comprises:

determining, by the UE, a PHICH resource, corresponding to the PUSCH transmitted in the special subframe n, in the subframe n+$k_{PHICH}$ according to a lowest Physical Resource Block (PRB) index of the PUSCH transmitted in the special subframe n, Demodulation Reference Signal (DMRS) cyclic shift information indicated in scheduling information of the PUSCH, and a prescribed or preconfigured value of IPHICH corresponding to the PUSCH transmitted in the special subframe n; and receiving, by the UE, the PHICH corresponding to the PUSCH in the subframe n+$k_{PHICH}$ according to the determined PHICH resource;

wherein the lowest PRB index of the PUSCH transmitted in the special subframe n is different from a lowest PRB index of a PUSCH transmitted in a corresponding uplink subframe for which the PHICH is received according to the value of $I_{PHICH}$ in the subframe n+$k_{PHICH}$, and/or the Demodulation Reference Signal (DMRS) cyclic shift information indicated in the scheduling information of the PUSCH transmitted in the special subframe n is different from DMRS cyclic shift information indicated in scheduling information of a PUSCH transmitted in a corresponding uplink subframe for which the PHICH is received according to the value of $I_{PHICH}$ in the subframe n+$k_{PHICH}$.

3. The method according to claim 1, wherein when mi is 2, receiving, by the UE, the PHICH corresponding to the PUSCH in the subframe n+$k_{PHICH}$ comprises:

determining, by the UE, $I_{PHICH}$ corresponding to the PUSCH transmitted in the special subframe n to be $I_{PHICH}$=1, and determining a PHICH resource, corresponding to the PUSCH, in the subframe n+$k_{PHICH}$ according to a value of $I_{PHICH}$; and receiving, by the UE, the PHICH corresponding to the PUSCH in the subframe n+$k_{PHICH}$ according to the determined PHICH resource;

wherein $I_{PHICH}$ is a parameter for determining the PHICH resource;

when mi is 3, receiving, by the UE, the PHICH corresponding to the PUSCH in the subframe n+$k_{PHICH}$ comprises:

determining, by the UE, $I_{PHICH}$ corresponding to the PUSCH transmitted in the special subframe n to be $I_{PHICH}$=2, and determining a PHICH resource, corresponding to the PUSCH, in the subframe n+$k_{PHICH}$ according to a value of $I_{PHICH}$; and receiving, by the UE, the PHICH corresponding to the PUSCH in the subframe n+$k_{PHICH}$ according to the determined PHICH resource;

wherein $I_{PHICH}$ is a parameter for determining the PHICH resource.

4. A method for transmitting feedback information of Physical Uplink Shared Channel, the method comprising:

receiving, by a network-side device, a Physical Uplink Shared Channel (PUSCH) in a special subframe n, wherein n is a subframe index of the special subframe; and transmitting, by the network-side device, a Physical Hybrid Automatic Repeat Request (HARQ) Indicating Channel (PHICH) corresponding to the PUSCH in a subframe n+$k_{PHICH}$, wherein the PHICH carries feedback information of the PUSCH, and $k_{PHICH}$ is a prescribed or preconfigured value to determine subframe n+$k_{PHICH}$;

wherein:

for a TDD uplink-downlink configuration 0, when n is 1 or 6, then $k_{PHICH}$ is one of 4, 5, 9, and 10; or for a TDD uplink-downlink configuration 1, when n is 1 or 6, then $k_{PHICH}$ is one of 3, 5, 8, 9, and 10; or for a TDD uplink-downlink configuration 2, when n is 1 or 6, then $k_{PHICH}$ is one of 2, 3, 4, 5, 7, 8, 9, and 10; or for a TDD uplink-downlink configuration 3, when n is 1, then $k_{PHICH}$ is one of 4, 5, 7, 8, 9, and 10; or for a TDD uplink-downlink configuration 4, when n is 1, then $k_{PHICH}$ is one of 3, 4, 5, 7, 8, 9, and 10; or for a TDD uplink-downlink configuration 5, when n is 1, then $k_{PHICH}$ is one of 2, 3, 4, 5, 7, 8, 9, and 10; or for a TDD uplink-downlink configuration 6, when n is 1, then $k_{PHICH}$ is one of 4, 5, 8, 9, and 10; or for a TDD uplink-downlink configuration 6, when n is 6, then $k_{PHICH}$ is one of 3, 4, 5, 9, and 10;

wherein the TDD uplink-downlink configuration is an uplink reference TDD uplink-downlink configuration, or a TDD uplink-downlink configuration configured in system information;

for the TDD uplink-downlink configuration 0, a number of PHICH groups in the subframe n+$k_{PHICH}$ determined by at least one of scheme 2 and scheme 4 below; for the TDD uplink-downlink configuration 1, a number of PHICH groups in the subframe n+$k_{PHICH}$ determined by at least one of scheme 2 and scheme 3 below; for the TDD uplink-downlink configuration 2-5, a number of PHICH groups in the subframe n+$k_{PHICH}$ determined by at least one of scheme 1 to scheme 3 below; for the TDD uplink-downlink configuration 6, a number of PHICH groups in the subframe n+$k_{PHICH}$ determined by at least one of scheme 2 or scheme 3 below;

wherein scheme 1:

for the TDD uplink-downlink configuration 1, when the subframe n+$k_{PHICH}$ is the subframe 0 and the subframe $k_{PHICH}$ is the subframe 9, or when the subframe n+$k_{PHICH}$ is the subframe 5 and the subframe $k_{PHICH}$ is the subframe 9, or for the TDD uplink-downlink configuration 2, when the subframe n+$k_{PHICH}$ is the subframe 0, 4, 5, or 9, or the subframe n+$k_{PHICH}$ is the subframe 1 and the subframe $k_{PHICH}$ is the subframe 10, or the subframe n+$k_{PHICH}$ is the subframe 6 and the subframe $k_{PHICH}$ is the subframe 10, or for the TDD uplink-downlink configuration 3, when the subframe n+$k_{PHICH}$ is the subframe 1, 5, or 6, or for the TDD uplink-downlink configuration 4, when the subframe n+$k_{PHICH}$ is the subframe 0, 1, 4, 5, or 6, or for the TDD uplink-downlink configuration 5, when the subframe n+$k_{PHICH}$ is the subframe 0, 1, 3, 4, 5, 6, or 9, then the subframe n+$k_{PHICH}$ comprises mi*$N_{PHICH}^{group}$ groups of PHICHs, wherein mi is 1;

wherein i is a subframe index of the subframe n+$k_{PHICH}$, and $N_{PHICH}^{group}$ is the number of PHICH groups determined according to a parameter configured in high-layer signaling;

scheme 2:

for the TDD uplink-downlink configuration 0, when $k_{PHICH}$ is 4, 5, 9, or 10, or for the TDD uplink-downlink configuration 1, when $k_{PHICH}$ is 3, 5, 8, or 10, or for the TDD uplink-downlink configuration 2, when $k_{PHICH}$ is 2 or 7, or for the TDD uplink-downlink configuration 3, when $k_{PHICH}$ is 7, 8, or 9, or for the TDD uplink-downlink configuration 4, when $k_{PHICH}$ is 7 or 8, or for the TDD uplink-downlink configuration 5, when $k_{PHICH}$ is 7, or for the TDD uplink-downlink configuration 6, when $k_{PHICH}$ is 3, 4, 5, 8, 9, or 10, then the subframe n+$k_{PHICH}$ comprises $m_i$*$N_{PHICH}^{group}$ groups of PHICHs, wherein $m_i$ is a value defined in 3GPP TS 36.211;

wherein i is a subframe index of the subframe n+$k_{PHICH}$, $m_i$ is a coefficient for determining the number of PHICH groups corresponding to a subframe i in a TDD system, and $N_{PHICH}^{group}$ is a number of PHICH groups determined according to a parameter configured in high-layer signaling;

scheme 3:

for the TDD uplink-downlink configuration 1, when the subframe n+$k_{PHICH}$ is the subframe 1, 4, 6, or 9, or for the TDD uplink-downlink configuration 2, when the subframe n+$k_{PHICH}$ is the subframe 3 or 8, or for the TDD uplink-downlink configuration 3, when the subframe n+$k_{PHICH}$ is the subframe 0, 8, or 9, or for the TDD uplink-downlink configuration 4, when the subframe n+$k_{PHICH}$ is the subframe 8 or 9, or for the TDD uplink-downlink configuration 5, when the subframe n+$k_{PHICH}$ is the subframe 8, or for the TDD uplink-downlink configuration 6, when the subframe n+$k_{PHICH}$ is the subframe 0, 5, or 9, then the subframe n+$k_{PHICH}$ comprises $m_i$*$N_{PHICH}^{group}$ groups of PHICHs, wherein $m_i$ is 2;

wherein i is a subframe index of the subframe n+$k_{PHICH}$, and $N_{PHICH}^{group}$ is a number of PHICH groups determined according to a parameter configured in high-layer signaling;

scheme 4:

for the TDD uplink-downlink configuration 0, when the subframe n+$k_{PHICH}$ is the subframe 0 or 5, then the subframe n+$k_{PHICH}$ comprises $m_i$*$N_{PHICH}^{group}$ groups of PHICHs, wherein $m_i$ is 3;

wherein i is a subframe index of the subframe n+$k_{PHICH}$, and $N_{PHICH}^{group}$ is a number of PHICH groups determined according to a parameter configured in high-layer signaling.

5. The method according to claim 4, wherein when mi is 1, transmitting, by the network-side device, the PHICH corresponding to the PUSCH in the subframe n+$k_{PHICH}$ comprises:

determining, by the network-side device, $I_{PHICH}$ corresponding to the PUSCH transmitted in the special subframe n to be $I_{PHICH}$=0, and determining a PHICH resource, corresponding to the PUSCH, in the subframe n+$k_{PHICH}$ according to a value of IPHICH; and transmitting, by the network-side device, the PHICH corresponding to the PUSCH in the subframe n+$k_{PHICH}$ according to the determined PHICH resource;

wherein $I_{PHICH}$ is a parameter for determining the PHICH resource;

when mi is a value defined in the 3GPP TS 36.211, transmitting, by the network-side device, the PHICH corresponding to the PUSCH in the subframe n+$k_{PHICH}$ comprises:

determining, by the network-side device, a PHICH resource, corresponding to the PUSCH transmitted in the special subframe n, in the subframe n+$k_{PHICH}$ according to a lowest PRB index of the PUSCH transmitted in the special subframe n, DMRS cyclic shift information indicated in scheduling information of the PUSCH, and a prescribed or preconfigured value of $I_{PHICH}$ corresponding to the PUSCH transmitted in the special subframe n; and transmitting, by the network-side device, the PHICH corresponding to the PUSCH in the subframe n+$k_{PHICH}$ according to the determined PHICH resource;

wherein the lowest PRB index of the PUSCH transmitted in the special subframe n is different from a lowest PRB index of a PUSCH transmitted in a corresponding uplink subframe for which the PHICH is received according to the value of $I_{PHICH}$ in the subframe n+$k_{PHICH}$, and/or the DMRS cyclic shift information indicated in the scheduling information of the PUSCH transmitted in the special subframe n is different from DMRS cyclic shift information indicated in scheduling information of a PUSCH transmitted in a corresponding uplink subframe for which the PHICH is received according to the value of IPHICH in the subframe n+$k_{PHICH}$.

6. The method according to claim 4, wherein when mi is 2, transmitting, by the network-side device, the PHICH corresponding to the PUSCH in the subframe n+$k_{PHICH}$ comprises:

determining, by the network-side device, $I_{PHICH}$ corresponding to the PUSCH transmitted in the special subframe n to be $I_{PHICH}$=1, and determining a PHICH resource, corresponding to the PUSCH, in the subframe n+$k_{PHICH}$ according to a value of IPHICH; and transmitting, by the network-side device, the PHICH corresponding to the PUSCH in the subframe n+$k_{PHICH}$ according to the determined PHICH resource;

wherein IPHICH is a parameter for determining the PHICH resource;

when mi is 3, transmitting, by the network-side device, the PHICH corresponding to the PUSCH in the subframe n+$k_{PHICH}$ comprises:

determining, by the network-side device, $I_{PHICH}$ corresponding to the PUSCH transmitted in the special subframe n to be $I_{PHICH}$=2, and determining a PHICH resource, corresponding to the PUSCH, in the subframe n+$k_{PHICH}$ according to a value of IPHICH; and transmitting, by the network-side device, the PHICH corresponding to the PUSCH in the subframe n+$k_{PHICH}$ according to the determined PHICH resource;

wherein $I_{PHICH}$ is a parameter for determining the PHICH resource.

7. A UE for receiving feedback information of Physical Uplink Shared Channel, the UE comprising a processor, a transceiver, and a memory, wherein:

the processor is configured to read and execute program in the memory:

to transmit a Physical Uplink Shared Channel (PUSCH) in a special subframe n through the transceiver, wherein n is a subframe index of the special subframe; and to receive a Physical Hybrid Automatic Repeat Request (HARQ) Indicating Channel (PHICH) corresponding to the PUSCH in a subframe n+$k_{PHICH}$ through the transceiver, wherein the PHICH carries feedback information of the PUSCH, and $k_{PHICH}$ is a prescribed or preconfigured value to determine subframe n+$k_{PHICH}$; and the transceiver is configured to receive and transmit data under the control of the processor;

wherein:

for a TDD uplink-downlink configuration 0, when n is 1 or 6, then $k_{PHICH}$ is one of 4, 5, 9, and 10; or for a TDD uplink-downlink configuration 1, when n is 1 or 6, then $k_{PHICH}$ is one of 3, 5, 8, 9, and 10; or for a TDD uplink-downlink configuration 2, when n is 1 or 6, then $k_{PHICH}$ is one of 2, 3, 4, 5, 7, 8, 9, and 10; or for a TDD uplink-downlink configuration 3, when n is 1, then $k_{PHICH}$ is one of 4, 5, 7, 8, 9, and 10; or for a TDD uplink-downlink configuration 4, when n is 1, then $k_{PHICH}$ is one of 3, 4, 5, 7, 8, 9, and 10; or for a TDD uplink-downlink configuration 5, when n is 1, then $k_{PHICH}$ is one of 2, 3, 4, 5, 7, 8, 9, and 10; or for a TDD uplink-downlink configuration 6, when n is 1, then $k_{PHICH}$ is one of 4, 5, 8, 9, and 10; or for a TDD uplink-downlink configuration 6, when n is 6, then $k_{PHICH}$ is one of 3, 4, 5, 9, and 10;

wherein the TDD uplink-downlink configuration is an uplink reference TDD uplink-downlink configuration, or a TDD uplink-downlink configuration configured in system information;

for the TDD uplink-downlink configuration 0, a number of PHICH groups in the subframe $n+k_{PHICH}$ determined by at least one of scheme 2 and scheme 4 below; for the TDD uplink-downlink configuration 1, a number of PHICH groups in the subframe $n+k_{PHICH}$ determined by at least one of scheme 2 and scheme 3 below; for the TDD uplink-downlink configuration 2-5, a number of PHICH groups in the subframe $n+k_{PHICH}$ determined by at least one of scheme 1 to scheme 3 below; for the TDD uplink-downlink configuration 6, a number of PHICH groups in the subframe $n+k_{PHICH}$ determined by at least one of scheme 2 or scheme 3 below;

wherein scheme 1:

for the TDD uplink-downlink configuration 1, when the subframe $n+k_{PHICH}$ is the subframe 0 and the subframe $k_{PHICH}$ is the subframe 9, or when the subframe $n+k_{PHICH}$ is the subframe 5 and the subframe $k_{PHICH}$ is the subframe 9, or for the TDD uplink-downlink configuration 2, when the subframe $n+k_{PHICH}$ is the subframe 0, 4, 5, or 9, or the subframe $n+k_{PHICH}$ is the subframe 1 and the subframe $k_{PHICH}$ is the subframe 10, or the subframe $n+k_{PHICH}$ is the subframe 6 and the subframe $k_{PHICH}$ is the subframe 10, or for the TDD uplink-downlink configuration 3, when the subframe $n+k_{PHICH}$ is the subframe 1, 5, or 6, or for the TDD uplink-downlink configuration 4, when the subframe $n+k_{PHICH}$ is the subframe 0, 1, 4, 5, or 6, or for the TDD uplink-downlink configuration 5, when the subframe $n+k_{PHICH}$ is the subframe 0, 1, 3, 4, 5, 6, or 9, then the subframe $n+k_{PHICH}$ comprises $m_i * N_{PHICH}^{group}$ groups of PHICHs, wherein $m_i$ is 1;

wherein i is a subframe index of the subframe $n+k_{PHICH}$, and $N_{PHICH}^{group}$ is a number of PHICH groups determined according to a parameter configured in high-layer signaling;

scheme 2:

for the TDD uplink-downlink configuration 0, when $k_{PHICH}$ is 4, 5, 9, or 10, or for the TDD uplink-downlink configuration 1, when $k_{PHICH}$ is 3, 5, 8, or 10, or for the TDD uplink-downlink configuration 2, when $k_{PHICH}$ is 2 or 7, or for the TDD uplink-downlink configuration 3, when $k_{PHICH}$ is 7, 8, or 9, or for the TDD uplink-downlink configuration 4, when $k_{PHICH}$ is 7 or 8, or for the TDD uplink-downlink configuration 5, when $k_{PHICH}$ is 7, or for the TDD uplink-downlink configuration 6, when $k_{PHICH}$ is 3, 4, 5, 8, 9, or 10, then the subframe $n+k_{PHICH}$ comprises $m_i * N_{PHICH}^{group}$ groups of PHICHs, wherein $m_i$ is a value defined in 3GPP TS 36.211;

wherein i is a subframe index of the subframe $n+k_{PHICH}$, $m_i$ is a coefficient for determining the number of PHICH groups corresponding to a subframe i in a TDD system, and $N_{PHICH}^{group}$ is a number of PHICH groups determined according to a parameter configured in high-layer signaling;

scheme 3:

for the TDD uplink-downlink configuration 1, when the subframe $n+k_{PHICH}$ is the subframe 1, 4, 6, or 9, or for the TDD uplink-downlink configuration 2, when the subframe $n+k_{PHICH}$ is the subframe 3 or 8, or for the TDD uplink-downlink configuration 3, when the subframe $n+k_{PHICH}$ is the subframe 0, 8, or 9, or for the TDD uplink-downlink configuration 4, when the subframe $n+k_{PHICH}$ is the subframe 8 or 9, or for the TDD uplink-downlink configuration 5, when the subframe $n+k_{PHICH}$ is the subframe 8, or for the TDD uplink-downlink configuration 6, when the subframe $n+k_{PHICH}$ is the subframe 0, 5, or 9, then the subframe $n+k_{PHICH}$ comprises $m_i * N_{PHICH}^{group}$ groups of PHICHs, wherein $m_i$ is 2;

wherein i is a subframe index of the subframe $n+k_{PHICH}$, and $N_{PHICH}^{group}$ is a number of PHICH groups determined according to a parameter configured in high-layer signaling;

scheme 4:

for the TDD uplink-downlink configuration 0, when the subframe $n+k_{PHICH}$ is the subframe 0 or 5, then the subframe $n+k_{PHICH}$ comprises $m_i * N_{PHICH}^{group}$ groups of PHICHs, wherein $m_i$ is 3;

wherein i is a subframe index of the subframe $n+k_{PHICH}$, and $N_{PHICH}^{group}$ is the number of PHICH groups determined according to a parameter configured in high-layer signaling.

8. The UE according to claim 7, wherein when mi is 1, the processor is configured: to determine $I_{PHICH}$ corresponding to the PUSCH transmitted in the special subframe n to be $I_{PHICH}=0$, and to determine a PHICH resource, corresponding to the PUSCH, in the subframe $n+k_{PHICH}$ according to a value of $I_{PHICH}$; and to receive the PHICH corresponding to the PUSCH in the subframe $n+k_{PHICH}$ according to the determined PHICH resource; wherein $I_{PHICH}$ is a parameter for determining the PHICH resource;

when mi is a value defined in the 3GPP TS 36.211, the processor is configured: to determine a PHICH resource, corresponding to the PUSCH transmitted in the special subframe n, in the subframe $n+k_{PHICH}$ according to a lowest PRB index of the PUSCH transmitted in the special subframe n, DMRS cyclic shift information indicated in scheduling information of the PUSCH, and a prescribed or preconfigured value of $I_{PHICH}$ corresponding to the PUSCH transmitted in the special subframe n; and to receive the PHICH corresponding to the PUSCH in the subframe $n+k_{PHICH}$ according to the determined PHICH resource; wherein the lowest PRB index of the PUSCH transmitted in the special subframe n is different from a lowest PRB index of a PUSCH transmitted in a corresponding uplink subframe for which the PHICH is received according to the value of $I_{PHICH}$ in the subframe $n+k_{PHICH}$, and/or the DMRS cyclic shift information indicated in the scheduling information of the PUSCH transmitted in the special subframe n is different from DMRS cyclic shift information indicated in scheduling information of a PUSCH transmitted in a corresponding uplink subframe for which the PHICH is received according to the value of $I_{PHICH}$ in the subframe $n+k_{PHICH}$;

when mi is 2, the processor is configured: to determine $I_{PHICH}$ corresponding to the PUSCH transmitted in the special subframe n to be $I_{PHICH}=1$, and to determine a PHICH resource, corresponding to the PUSCH, in the subframe $n+k_{PHICH}$ according to a value of $I_{PHICH}$; and to receive the PHICH corresponding to the PUSCH in the subframe $n+k_{PHICH}$ according to the determined PHICH resource; wherein $I_{PHICH}$ is a parameter for determining the PHICH resource;

when mi is 3, the processor is configured: to determine $I_{PHICH}$ corresponding to the PUSCH transmitted in the special subframe n to be $I_{PHICH}=2$, and to determine a PHICH resource, corresponding to the PUSCH, in the subframe $n+k_{PHICH}$ according to a value of $I_{PHICH}$; and to receive the PHICH corresponding to the PUSCH in the subframe $n+k_{PHICH}$ according to the determined PHICH resource; wherein $I_{PHICH}$ is a parameter for determining the PHICH resource.

9. A network-side device for transmitting feedback information of Physical Uplink Shared Channel, the network-side device comprising a processor, a transceiver, and a memory, wherein:

the processor is configured to read and execute program in the memory:
to receive a Physical Uplink Shared Channel (PUSCH) in a special subframe n through the transceiver, wherein n is a subframe index of the special subframe; and to transmit a Physical Hybrid Automatic Repeat Request (HARQ) Indicating Channel (PHICH) corresponding to the PUSCH in a subframe $n+k_{PHICH}$ through the transceiver, wherein the PHICH carries feedback information of the PUSCH, and $k_{PHICH}$ is a prescribed or preconfigured value to determine subframe $n+k_{PHICH}$; and the transceiver is configured to receive and transmit data under the control of the processor;

wherein:
for a TDD uplink-downlink configuration 0, when n is 1 or 6, then $k_{PHICH}$ is one of 4, 5, 9, and 10; or
for a TDD uplink-downlink configuration 1, when n is 1 or 6, then $k_{PHICH}$ is one of 3, 5, 8, 9, and 10; or
for a TDD uplink-downlink configuration 2, when n is 1 or 6, then $k_{PHICH}$ is one of 2, 3, 4, 5, 7, 8, 9, and 10; or
for a TDD uplink-downlink configuration 3, when n is 1, then $k_{PHICH}$ is one of 4, 5, 7, 8, 9, and 10; or
for a TDD uplink-downlink configuration 4, when n is 1, then $k_{PHICH}$ is one of 3, 4, 5, 7, 8, 9, and 10; or
for a TDD uplink-downlink configuration 5, when n is 1, then $k_{PHICH}$ is one of 2, 3, 4, 5, 7, 8, 9, and 10; or
for a TDD uplink-downlink configuration 6, when n is 1, then $k_{PHICH}$ is one of 4, 5, 8, 9, and 10; or
for a TDD uplink-downlink configuration 6, when n is 6, then $k_{PHICH}$ is one of 3, 4, 5, 9, and 10;
wherein the TDD uplink-downlink configuration is an uplink reference TDD uplink-downlink configuration, or a TDD uplink-downlink configuration configured in system information;
for the TDD uplink-downlink configuration 0, a number of PHICH groups in the subframe $n+k_{PHICH}$ determined by at least one of scheme 2 and scheme 4 below;
for the TDD uplink-downlink configuration 1, a number of PHICH groups in the subframe $n+k_{PHICH}$ determined by at least one of scheme 2 and scheme 3 below;

for the TDD uplink-downlink configuration 2-5, a number of PHICH groups in the subframe $n+k_{PHICH}$ determined by at least one of scheme 1 to scheme 3 below; for the TDD uplink-downlink configuration 6, a number of PHICH groups in the subframe n+k determined by at least one of scheme 2 or scheme 3 below;

wherein scheme 1:
for the TDD uplink-downlink configuration 1, when the subframe $n+k_{PHICH}$ is the subframe 0 and the subframe $k_{PHICH}$ is the subframe 9, or when the subframe $n+k_{PHICH}$ is the subframe 5 and the subframe $k_{PHICH}$ is the subframe 9, or for the TDD uplink-downlink configuration 2, when the subframe $n+k_{PHICH}$ is the subframe 0, 4, 5, or 9, or the subframe $n+k_{PHICH}$ is the subframe 1 and the subframe $k_{PHICH}$ is the subframe 10, or the subframe $n+k_{PHICH}$ is the subframe 6 and the subframe $k_{PHICH}$ is the subframe 10, or for the TDD uplink-downlink configuration 3, when the subframe $n+k_{PHICH}$ is the subframe 1, 5, or 6, or for the TDD uplink-downlink configuration 4, when the subframe $n+k_{PHICH}$ is the subframe 0, 1, 4, 5, or 6, or for the TDD uplink-downlink configuration 5, when the subframe $n+k_{PHICH}$ is the subframe 0, 1, 3, 4, 5, 6, or 9, then the subframe $n+k_{PHICH}$ comprises $m_i*N_{PHICH}^{group}$ groups of PHICHs, wherein $m_i$ is 1;

wherein i is a subframe index of the subframe $n+k_{PHICH}$, and $N_{PHICH}^{group}$ is a number of PHICH groups determined according to a parameter configured in high-layer signaling;

scheme 2:
for the TDD uplink-downlink configuration 0, when $k_{PHICH}$ is 4, 5, 9, or 10, or for the TDD uplink-downlink configuration 1, when $k_{PHICH}$ is 3, 5, 8, or 10, or for the TDD uplink-downlink configuration 2, when $k_{PHICH}$ is 2 or 7, or for the TDD uplink-downlink configuration 3, when $k_{PHICH}$ is 7, 8, or 9, or for the TDD uplink-downlink configuration 4, when $k_{PHICH}$ is 7 or 8, or for the TDD uplink-downlink configuration 5, when $k_{PHICH}$ is 7, or for the TDD uplink-downlink configuration 6, when $k_{PHICH}$ is 3, 4, 5, 8, 9, or 10, then the subframe $n+k_{PHICH}$ comprises $m_i*N_{PHICH}^{group}$ groups of PHICHs, wherein $m_i$ is a value defined in 3GPP TS 36.211;

wherein i is a subframe index of the subframe $n+k_{PHICH}$, $m_i$ is a coefficient for determining the number of PHICH groups corresponding to a subframe i in a TDD system, and $N_{PHICH}^{group}$ is a number of PHICH groups determined according to a parameter configured in high-layer signaling;

scheme 3:
for the TDD uplink-downlink configuration 1, when the subframe $n+k_{PHICH}$ is the subframe 1, 4, 6, or 9, or for the TDD uplink-downlink configuration 2, when the subframe $n+k_{PHICH}$ is the subframe 3 or 8, or for the TDD uplink-downlink configuration 3, when the subframe $n+k_{PHICH}$ is the subframe 0, 8, or 9, or for the TDD uplink-downlink configuration 4, when the subframe $n+k_{PHICH}$ is the subframe 8 or 9, or for the TDD uplink-downlink configuration 5, when the subframe $n+k_{PHICH}$ is the subframe 8, or for the TDD uplink-downlink configuration 6, when the subframe $n+k_{PHICH}$ is the subframe 0, 5, or 9, then the subframe $n+k_{PHICH}$ comprises $m_i*N_{PHICH}^{group}$ groups of PHICHs, wherein $m_i$ is 2;

wherein i is a subframe index of the subframe $n+k_{PHICH}$, and $N_{PHICH}^{group}$ is a number of PHICH groups determined according to a parameter configured in high-layer signaling;

scheme 4:

for the TDD uplink-downlink configuration 0, when the subframe $n+k_{PHICH}$ is the subframe 0 or 5, then the subframe $n+k_{PHICH}$ comprises $m_i*N_{PHICH}^{group}$ groups of PHICHs, wherein $m_i$ is 3;

wherein i is a subframe index of the subframe $n+k_{PHICH}$, and $N_{PHICH}^{group}$ is a number of PHICH groups determined according to a parameter configured in high-layer signaling.

10. The network-side device according to claim 9, wherein when mi is 1, the processor is configured: to determine $I_{PHICH}$ corresponding to the PUSCH transmitted in the special subframe n to be $I_{PHICH}=0$, and to determine a PHICH resource, corresponding to the PUSCH, in the subframe $n+k_{PHICH}$ according to a value of $I_{PHICH}$; and to transmit the PHICH corresponding to the PUSCH in the subframe $n+k_{PHICH}$ according to the determined PHICH resource; wherein $I_{PHICH}$ is a parameter for determining the PHICH resource;

when mi is a value defined in the 3GPP TS 36.211, the processor is configured: to determine a PHICH resource, corresponding to the PUSCH transmitted in the special subframe n, in the subframe $n+k_{PHICH}$ according to a lowest PRB index of the PUSCH transmitted in the special subframe n, DMRS cyclic shift information indicated in scheduling information of the PUSCH, and a prescribed or preconfigured value of $I_{PHICH}$ corresponding to the PUSCH transmitted in the special subframe n; and to transmit the PHICH corresponding to the PUSCH in the subframe $n+k_{PHICH}$ according to the determined PHICH resource; wherein the lowest PRB index of the PUSCH transmitted in the special subframe n is different from a lowest PRB index of a PUSCH transmitted in a corresponding uplink subframe for which the PHICH is transmitted according to the value of $I_{PHICH}$ in the subframe $n+k_{PHICH}$, and/or the DMRS cyclic shift information indicated in the scheduling information of the PUSCH transmitted in the special subframe n is different from DMRS cyclic shift information indicated in scheduling information of a PUSCH transmitted in a corresponding uplink subframe for which the PHICH is received according to the value of $I_{PHICH}$ in the subframe $n+k_{PHICH}$;

when mi is 2, the processor is configured: to determine $I_{PHICH}$ corresponding to the PUSCH transmitted in the special subframe n to be $I_{PHICH}=1$, and to determine a PHICH resource, corresponding to the PUSCH, in the subframe $n+k_{PHICH}$ according to a value of $I_{PHICH}$; and to transmit the PHICH corresponding to the PUSCH in the subframe $n+k_{PHICH}$ according to the determined PHICH resource; wherein $I_{PHICH}$ is a parameter for determining the PHICH resource;

when mi is 3, the processor is configured: to determine $I_{PHICH}=2$ corresponding to the PUSCH transmitted in the special subframe n to be $I_{PHICH}=2$, and to determine a PHICH resource, corresponding to the PUSCH, in the subframe $n+k_{PHICH}$ according to a value of $I_{PHICH}$; and to transmit the PHICH corresponding to the PUSCH in the subframe $n+k_{PHICH}$ according to the determined PHICH resource; wherein $I_{PHICH}$ is a parameter for determining the PHICH resource.

* * * * *